US009157533B2

(12) United States Patent
Sin

(10) Patent No.: US 9,157,533 B2
(45) Date of Patent: Oct. 13, 2015

(54) MULTI-VANE THROTTLE VALVE

(71) Applicant: Ferrotec (USA) Corporation, Santa Clara, CA (US)

(72) Inventor: Pheng Sin, Livermore, CA (US)

(73) Assignee: Ferrotec (USA) Corporation, Santa Clara, CA (US)

( * ) Notice: Subject to any disclaimer, the term of this patent is extended or adjusted under 35 U.S.C. 154(b) by 0 days.

(21) Appl. No.: 14/458,682

(22) Filed: Aug. 13, 2014

(65) Prior Publication Data

US 2014/0345698 A1    Nov. 27, 2014

Related U.S. Application Data

(63) Continuation of application No. 13/549,771, filed on Jul. 16, 2012, now Pat. No. 8,833,383.

(51) Int. Cl.
*F16K 1/22* (2006.01)
*F16K 51/02* (2006.01)
*F16K 49/00* (2006.01)
*F16K 1/16* (2006.01)
*F16K 1/20* (2006.01)

(52) U.S. Cl.
CPC .............. *F16K 1/223* (2013.01); *F16K 1/165* (2013.01); *F16K 1/2014* (2013.01); *F16K 1/222* (2013.01); *F16K 49/007* (2013.01); *F16K 51/02* (2013.01); *Y10T 137/0318* (2015.04); *Y10T 137/6579* (2015.04); *Y10T 137/87475* (2015.04)

(58) Field of Classification Search
CPC ....... F16K 1/165; F16K 1/223; F16K 49/007; F16K 51/02; F24F 13/15

USPC ......................................... 137/601.08, 601.09
See application file for complete search history.

(56) References Cited

U.S. PATENT DOCUMENTS

| | | | | |
|---|---|---|---|---|
| 4,610,197 A | * | 9/1986 | Van Becelaere | 454/335 |
| 5,580,307 A | * | 12/1996 | Arosio et al. | 454/336 |
| 5,765,592 A | * | 6/1998 | Karlicek | 137/601.06 |
| 6,003,554 A | * | 12/1999 | Magdelyns et al. | 137/630.14 |
| 6,293,306 B1 | * | 9/2001 | Brenes | 137/601.09 |
| 6,427,969 B1 | | 8/2002 | Ho et al. | |
| 2011/0140023 A1 | * | 6/2011 | Sauer et al. | 251/298 |

FOREIGN PATENT DOCUMENTS

| JP | S56 132440 U | 10/1981 |
|---|---|---|
| JP | S60 28660 U | 2/1985 |

OTHER PUBLICATIONS

Extended European Search Report for EPA 12 51 4127.2 based on PCT/US2012/047102, mail date of Feb. 19, 2015.

* cited by examiner

*Primary Examiner* — Kevin Murphy
(74) *Attorney, Agent, or Firm* — Robert R. Deleault, Esq.; Mesmer & Deleault, PLLC

(57) ABSTRACT

A multi-vane throttling valve for a vacuum process chamber includes a reciprocal vane pivotally connected to and extending backwardly away from a back side of each of a plurality of rotatable vanes, and a stationary reciprocal vane angling assembly fixed in a predefined position and having an assembly pin extending transversely toward the reciprocal vane a predefined distance sufficient to support the reciprocal vane whereby the stationary angling assembly causes the reciprocal vane to pivot in a range between a substantially parallel position with the respective rotatable vane and a transverse position with the respective rotatable vane when the respective rotatable vane is rotated.

22 Claims, 17 Drawing Sheets

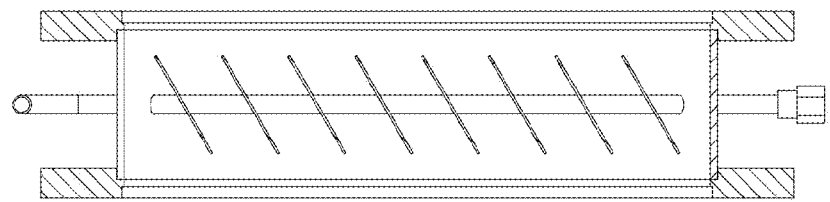
Fig. 1B - Prior Art
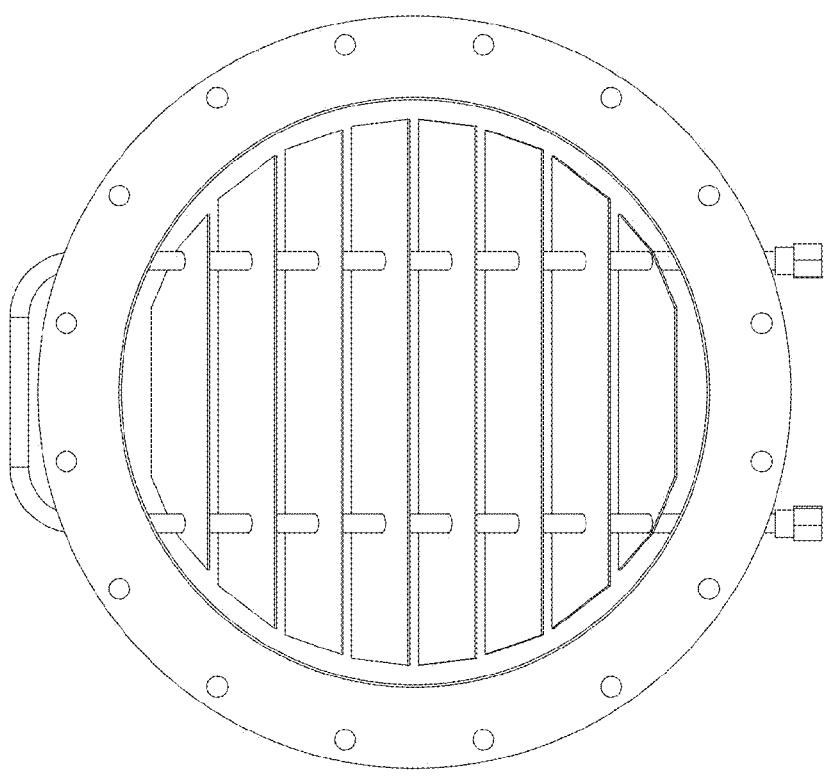
Fig. 1A - Prior Art

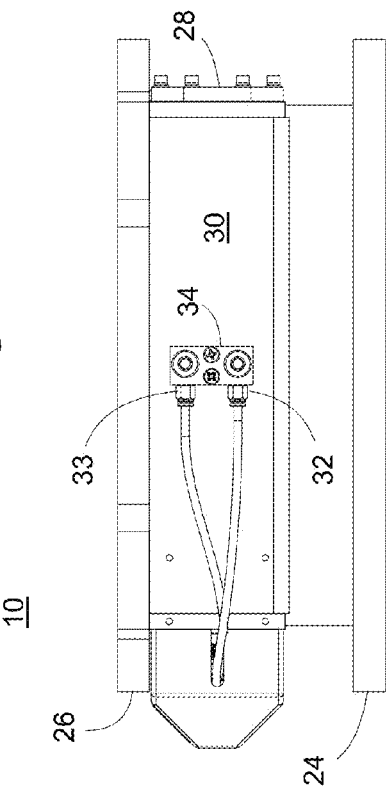
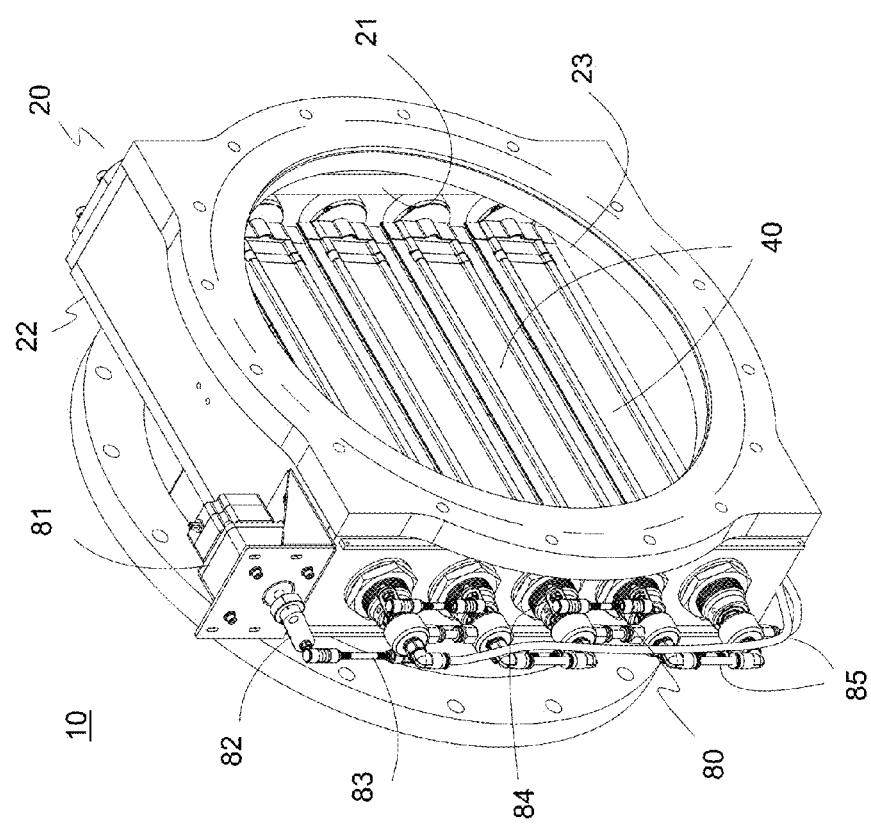

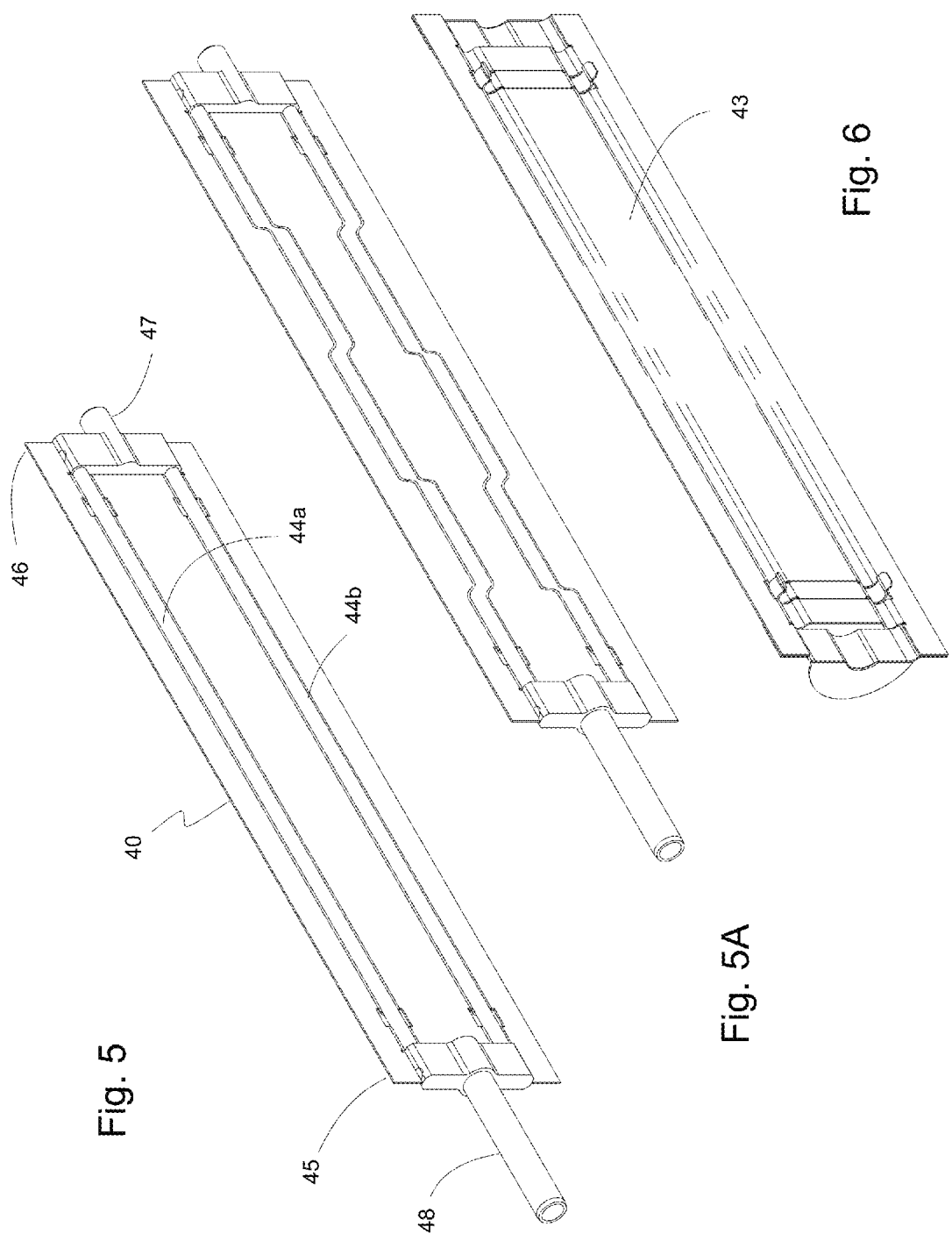

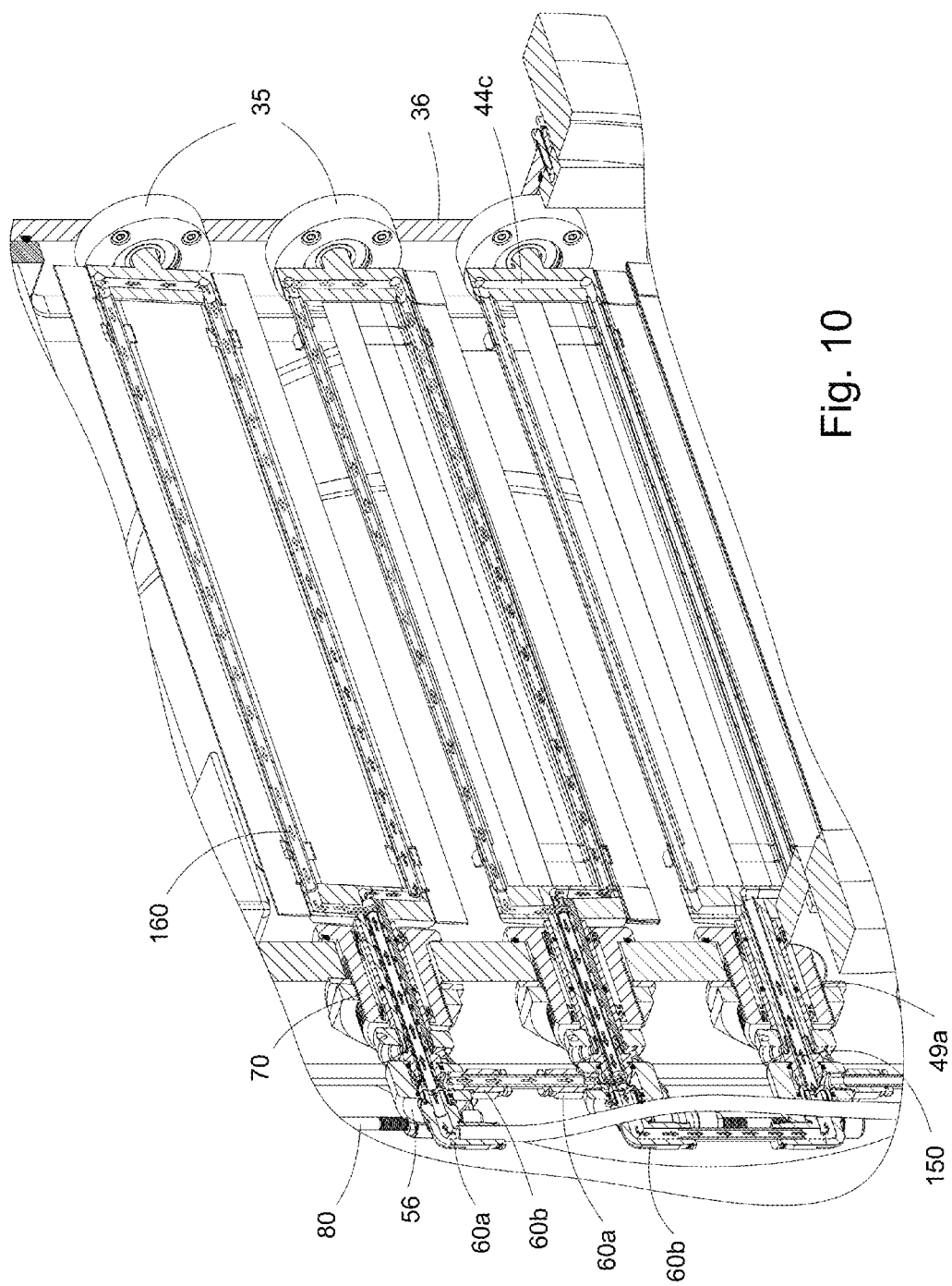

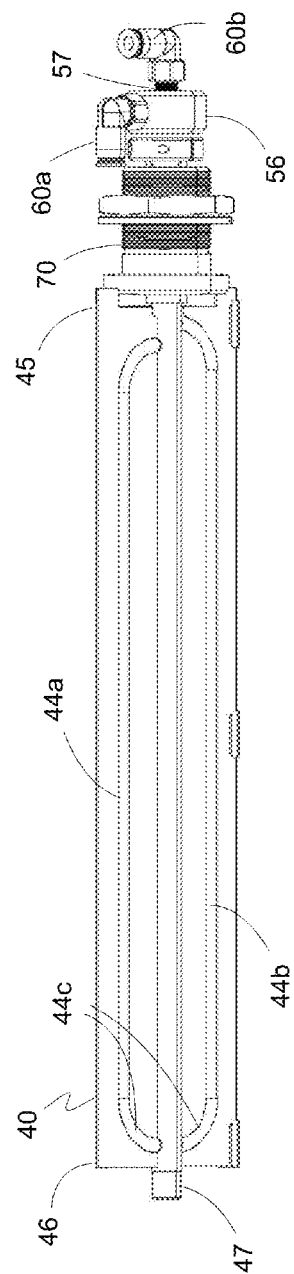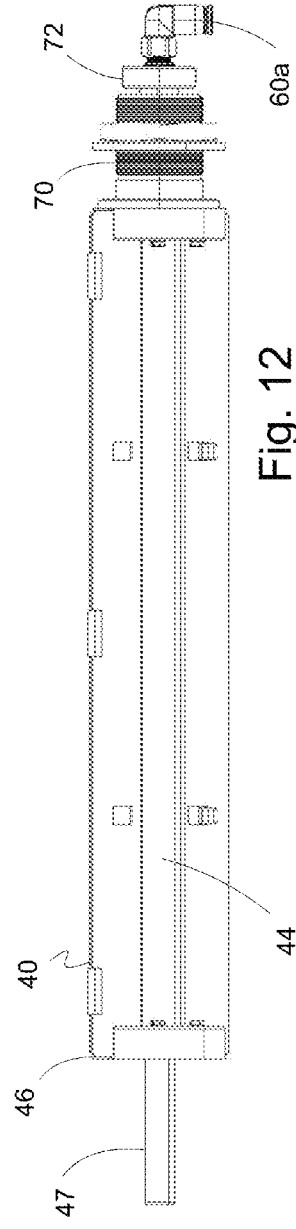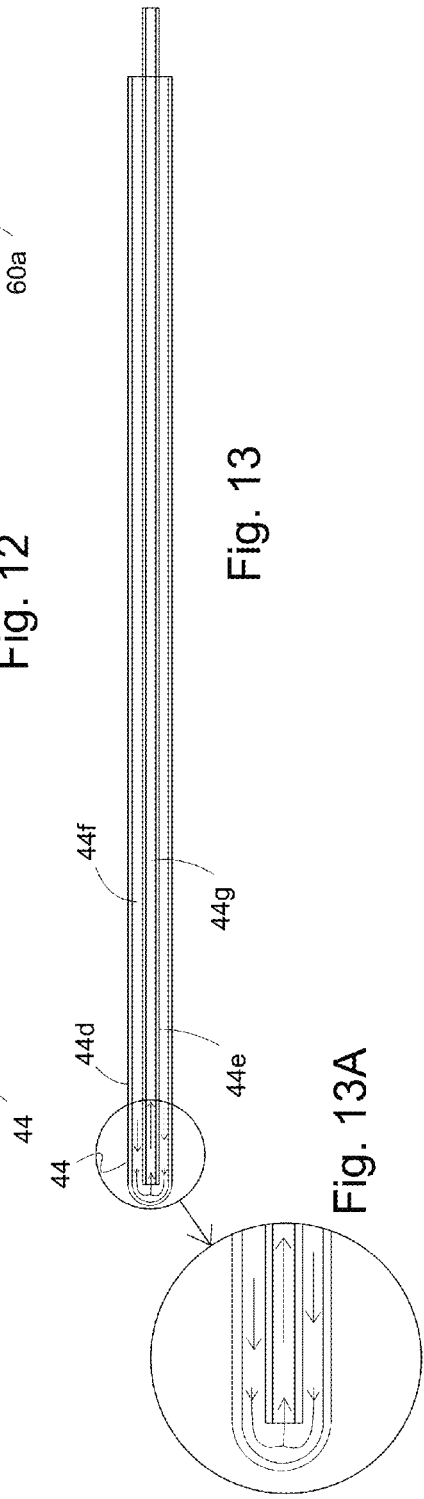

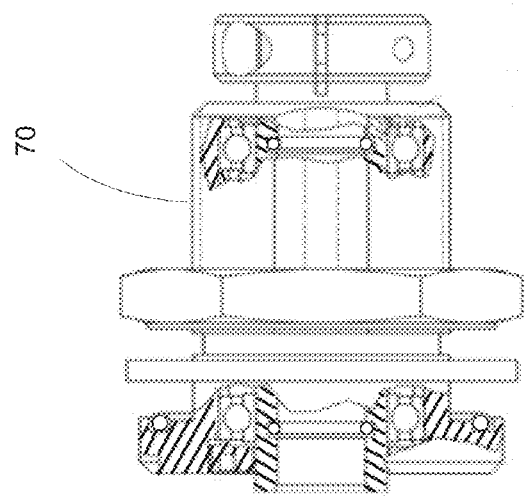
Fig. 17
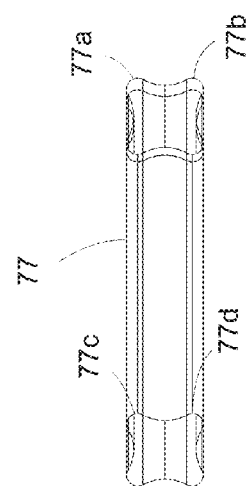
Fig. 16B
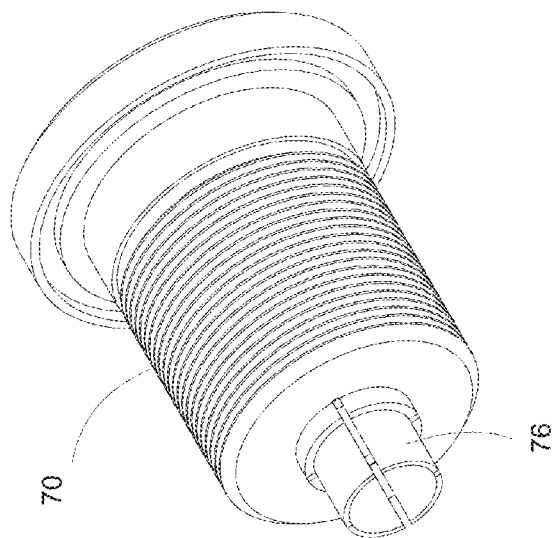
Fig. 15
Fig. 16A

MULTI-VANE THROTTLE VALVE

This is a Continuation-In-Part of U.S. patent application Ser. No. 13/549,771, filed Jul. 16, 2012, which application claims the benefit of U.S. Provisional Patent Application No. 61/509,765, filed Jul. 20, 2011.

BACKGROUND OF THE INVENTION

1. Field of the Invention

The present invention relates generally to valves for processing systems. Particularly, the present invention relates to throttle valves for vacuum systems.

2. Description of the Prior Art

Various types of valves have been devised for use in vacuum processing systems. The types of valves include gate valves, butterfly valves, multi-vane valves, and the like. Some gate valves are designed for opened and closed positions to allow for either full flow or no flow of gaseous fluids through the valve. Butterfly valves are relatively simple in design but have limited ability to achieve a linear conductance response. Multi-vane valves provide more precise control than butterfly valves.

One example of a multi-vane valve is described in U.S. Pat. No. 6,293,306 (Brenes, 2001). Brenes discloses a throttle gate valve that includes an upright, generally rectangular valve housing. Within the valve housing is positioned a linearly movable gate valve for closing off a thru-opening formed in the lower part of the valve housing. A pneumatic actuator assembly provides for moving the gate valve between an opened and a closed position. A throttle valve assembly compartment forms the lower side of valve housing and frames the through opening and includes a set of throttle vanes rotatably positioned within the through opening. A drive actuator is provided for rotating the vanes and includes a drive actuator compartment and a motor for controlling the position of the throttle vanes. The drive actuator is sealed by a bellows shield at the point where the drive actuator extends into the interior of the housing.

Another type of multi-vane valve is a throttle valve sold under the trademark "Vari-Q" by MeiVac, Inc. The MeiVac throttle valve includes a circular valve chamber containing a plurality of counter-rotating, triangular (i.e. pie shaped) vanes that are interconnected by a low friction cable-drive system.

Still another type of multi-vane valve is a fixed-positioned vane valve sold under the trademark "Temescal" by Ferrotec (USA) Corporation as part number 0627-0624-0. This multi-vane valve is not truly a valve since all of the vanes are in a fixed position in the range of 30-45 degrees, which are in fluid communication with cryogenic pumps. The vanes are each brazed to a stainless steel tube that is transverse to all of the vanes. The vanes act as a heat shield as well as to transfer heat to the stainless steel tube that contains cooling water flowing through the tube. FIGS. 1A and 1B illustrates an example of such a fixed, multi-vane valve showing a front view and a cross-sectional side view of the structural relationship of the cooling tube and the plurality of fixed vanes.

SUMMARY OF THE INVENTION

Vacuum processing systems generally have a processing chamber of the type typically used for fabrication of computer chips and a vacuum pump, which is used to evacuate the processing chamber. High-vacuum pumps typically operate at pressures below those for plasma processing. All multi-vane valves attempt to provide greater control of the processing environment and to protect the high-vacuum pumps from heat and debris from the processing chamber. Multi-vane valves work by throttling the gas in the process chamber to create a differential pressure across the valve allowing the vacuum pump to operate at high vacuum levels while maintaining correct process pressures in the chamber. Multi-vane throttle valves having rotatable vanes provide greater control of the correct process pressures in the chamber by providing linear control over the full range of operation of the multi-vane valve. The disadvantage of the multi-vane throttle valves of the prior art is their limited capacity to shield the high vacuum pump from heat and/or debris.

It is an object of the present invention to provide a multi-vane throttle valve for use in vacuum processing systems capable of providing a full range of linear conductance control. It is another object of the present invention to provide a multi-vane throttle valve that is capable of performing as a heat shield for the vacuum pump. It is a further object of the present invention to provide a multi-vane throttle valve that is a heat shield with vane cooling capacity. It is a further object of the present invention to provide a multi-vane throttle valve with a simplified construction for maintaining the vacuum seal integrity between the vane chamber and the atmospheric side of the valve.

The present invention achieves these and other objectives by providing a multi-vane throttle valve for controlling the conductance of a vacuum pumping port and to protect the vacuum pump from debris and heat exposure.

In one embodiment, a multi-vane throttle valve for a vacuum process chamber includes a throttle chamber body having an inside exposed to the vacuum process chamber and an outside exposed to atmospheric pressure, the chamber body defining a through-opening for controlling vacuum within the vacuum process chamber, a plurality of rotatable vanes mounted within the through-opening for controlling a flow of gases through the through-opening where each rotatable vane includes a cooling fluid pathway in fluid communication with and disposed longitudinally along each rotatable vane, and a drive mechanism disposed on and connected to an outside of the throttle chamber body for rotating the plurality of rotatable vanes to vary the flow of process gases.

In another embodiment of the present invention, the cooling fluid pathway is a cooling conduit disposed longitudinally along the rotatable vane.

In further embodiment of the present invention, the cooling conduit is selected from the group consisting of a straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, and a longitudinal heat pipe.

In yet another embodiment of the present invention, each of the plurality of rotatable vanes are interconnected in series forming a single, continuous flow path.

In still another embodiment of the present invention, the drive mechanism includes an actuator arm, a rotating arm fixedly connected to each rotatable vane, and a linking arm pivotally connecting a rotating arm of one rotatable vane with a rotating arm of an adjacent rotatable vane in series where one linking arm connects to the actuator arm.

In another embodiment of the present invention, the rotating arm is connected on one end to the rotatable vane and on the other end to the linking arm In a further embodiment of the present invention, the throttling valve includes a debris shield attached to each of the plurality of rotatable vanes.

In still another embodiment of the present invention, the throttle chamber body includes a first body flange, a second body flange and a vane chamber housing connected between the first body flange and the second body flange where the vane chamber housing contains the plurality of rotatable vanes.

In a further embodiment of the present invention, the vane chamber housing includes a top plate, a bottom plate, a first chamber side wall, a second chamber side wall, and a vane support feedthrough attached to the first chamber side wall that supports the cooling fluid pathway of a rotatable vane and maintains the pressure differential between the vacuum chamber process and the atmospheric pressure.

In yet another embodiment of the present invention, the throttle valve includes a vacuum feedthrough supporting each of the plurality of rotatable vanes between the vacuum chamber process inside and the atmospheric pressure outside of the throttling valve.

In another embodiment, the multi-vane throttle valve includes a magnetic fluid vacuum feedthrough supporting each of the rotating vanes on one end between the inside and the outside of the throttle chamber body.

In a further embodiment, the multi-vane throttle valve includes a rotary adapter connected to one end of each rotating vane for transporting cooling fluid between each rotating vane.

In still another embodiment of the multi-vane throttle valve, when the cooling conduit is a heat pipe, the throttle valve further includes a cooling block for rotatably receiving one end portion of the heat pipe that is outside of the vane chamber housing. The cooling block may optionally be a liquid flow block or a thermoelectric module block or a combination thereof.

In yet another embodiment of the multi-vane throttle valve, the rotating vane includes a cooling conduit extending laterally along the longitudinal center line of the rotating vane and into a rotating joint that transports cooling fluid between each rotating vane.

In another embodiment of the multi-vane throttle valve, the rotating vane includes a cooling conduit having a pair of concentric tubes extending laterally along the longitudinal center line of the rotating vane and into a rotating joint that transports cooling fluid between each rotating vane.

In a further embodiment of the multi-vane throttle valve, the rotating vane includes a first cooling conduit disposed on the vane to one side of the longitudinal center line of the rotating vane and a second cooling conduit disposed on the vane to an opposite side of the longitudinal center line of the rotating vane. The first cooling conduit is in fluid communication with the second cooling conduit and both cooling conduits are in fluid communication with a rotating joint that transports cooling fluid between each rotating vane.

In another embodiment of the multi-vane throttle valve, the rotating vane includes a debris shield disposed onto one side of the rotating vane.

In still another embodiment of the multi-vane throttle valve, the valve includes a coolant selected from water, cryogenic material and the like.

In another embodiment of a multi-vane throttle valve, the valve includes a reciprocal vane pivotally connected to a back side of each of the plurality of rotatable vanes and extending backwardly away from each of the respective rotatable vane, and a stationary reciprocal vane angling assembly fixed in a predefined position, the vane angling assembly having an assembly pin extending transversely toward the reciprocal vane a predefined distance sufficient to support the reciprocal vane. The stationary angling assembly causes the reciprocal vane to pivot in a range between a substantially parallel position with the respective rotatable vane and a transverse position with the respective rotatable vane when the respective rotatable vane is rotated to control the flow of gases through the through-opening.

In a further embodiment, the stationary angling assembly further includes an assembly arm extending backwardly a predefined distance from the axis of rotation of a respective rotatable vane where the assembly pin is fixedly attached to a distal end of the assembly arm.

In still another embodiment, the stationary angling assembly further includes an assembly clamp connected to a proximal end of the assembly arm wherein the assembly clamp is fixed to a non-moving element within the throttle valve.

In yet another embodiment, the reciprocal vane is offset from an axis of rotation of the respective rotatable vane.

In another embodiment, there is included a reciprocal vane bracket having a reciprocal vane portion and a rotatable vane portion where the reciprocal vane portion and the reciprocal vane are pivotally connected to each other and the rotatable vane portion is fixedly attached to the rotatable vane.

In another embodiment, a pin magnetic element disposed on and fixedly attached to the assembly pin, and a reciprocal vane magnetic element disposed on and fixedly attached to a supported side of the reciprocal vane that is opposed to the assembly pin. The pin magnetic element and the reciprocal vane magnetic element have the same magnetic pole facing each other to thereby repel each other providing non-contact, reciprocal vane angling adjustment.

In a further embodiment, each of the plurality of rotatable vanes includes a coolant block disposed concentrically on the axis of rotation of the rotatable vane and containing a cooling fluid pathway defining a cooling conduit disposed longitudinally along the rotatable vane.

In another embodiment of the present invention, there is disclosed a method of preventing heat and deposition particles in an electron beam vacuum deposition system from entering a vacuum pump of the deposition system during a vacuum chamber process. The method includes obtaining a multi-vane throttling valve for use with a vacuum process chamber where the multi-vane throttling valve has a plurality of rotatable vanes, configuring each of the plurality of rotatable vanes with a reciprocal vane pivotally connected to a back side of each of the plurality of rotatable vanes and extending backwardly away from each respective rotatable vane, and rotatably adjusting the orientation of each rotatable vane to thereby cause the reciprocal vane to pivot in a range between a substantially parallel position with the respective rotatable vane and a transverse position with the respective rotatable vane when the respective rotatable vane is rotated to control the flow of gases through the through-opening to provide linear conductance control during vacuum processing in the vacuum process chamber.

In still another embodiment of the method, the method further includes offsetting the reciprocal vane from the axis of rotation of the rotatable vane.

In yet another method, there is disclosed a method of preventing heat and deposition particles in an electron beam vacuum deposition system from entering a vacuum pump of the deposition system during a vacuum chamber process using a throttling valve that includes rotatably adjusting the orientation of a rotatable vane disposed within the throttling valve causing a reciprocal vane pivotally connected to a back side of the rotatable vane to pivot to a transverse position with respect to the rotatable vane where the reciprocal vane extends backwardly away from the rotatable vane. The reciprocal vane is supported by a stationary angling assembly having an assembly pin that supports the reciprocal vane, which reciprocal vane deflects heat and deposition particles directed toward the throttling valve away from the vacuum pump of the deposition system. The method optionally includes selecting a stationary angling assembly and a reciprocal vane having a pin magnetic element disposed on and fixedly attached to the assembly pin, and a reciprocal vane magnetic element disposed on and fixedly attached to a supported side of the reciprocal vane that is opposed to the assembly pin. The pin magnetic element and the reciprocal vane magnetic element have the same magnetic pole facing each other to thereby repel each other and to provide non-contact, reciprocal vane angling adjustment.

BRIEF DESCRIPTION OF THE DRAWINGS

FIG. 1A is a front view of one prior art device of a multi-vane valve.

FIG. 1B is a side view of the prior art device shown in FIG. 1A.

FIG. 2 is a perspective of one embodiment of the present invention showing a multi-vane throttle valve.

FIG. 3 is a bottom view of the embodiment shown in FIG. 2.

FIG. 5 is a perspective view of one embodiment of a rotatable vane of the present invention showing a pair of parallel, straight cooling conduits.

FIG. 5A is a perspective view of another embodiment of a rotatable vane showing a pair of mirror-image, square-wave cooling conduits.

FIG. 6 is a perspective view of one embodiment of a debris shield of the present invention.

FIG. 10 is an enlarged, partial cross-sectional view of the fluid conduit showing the connections between at least two rotatable vanes and the fluid flow directions through the fluid conduit.

FIG. 11 is a side view of one embodiment of a vane in the present invention showing a rotary valve with a single rotary valve housing.

FIG. 12 is a side view of another embodiment of a vane of the present invention showing a coolant conduit that is a single tube positioned along the longitudinal central axis of the vane.

FIG. 13 is a cross-sectional view of another embodiment of a vane of the present invention showing a pair of concentric tubes positioned along the longitudinal central axis of the vane.

FIG. 13A is an enlarged, cross-sectional view of the sealed end of the pair of concentric tubes showing one of two possible flow paths of the cooling fluid.

FIG. 15 is a perspective view of one embodiment of a feedthrough of the present invention.

FIG. 16A is a perspective view of a quad O-ring incorporated in one embodiment of a feedthrough of the present invention.

FIG. 16B is a cross-sectional view of the quad O-ring shown in FIG. 16A.

FIG. 17 is a side view of a feedthrough of the present invention that is a magnetic fluid feedthrough.

DETAILED DESCRIPTION OF THE PREFERRED EMBODIMENT

Figure 4:
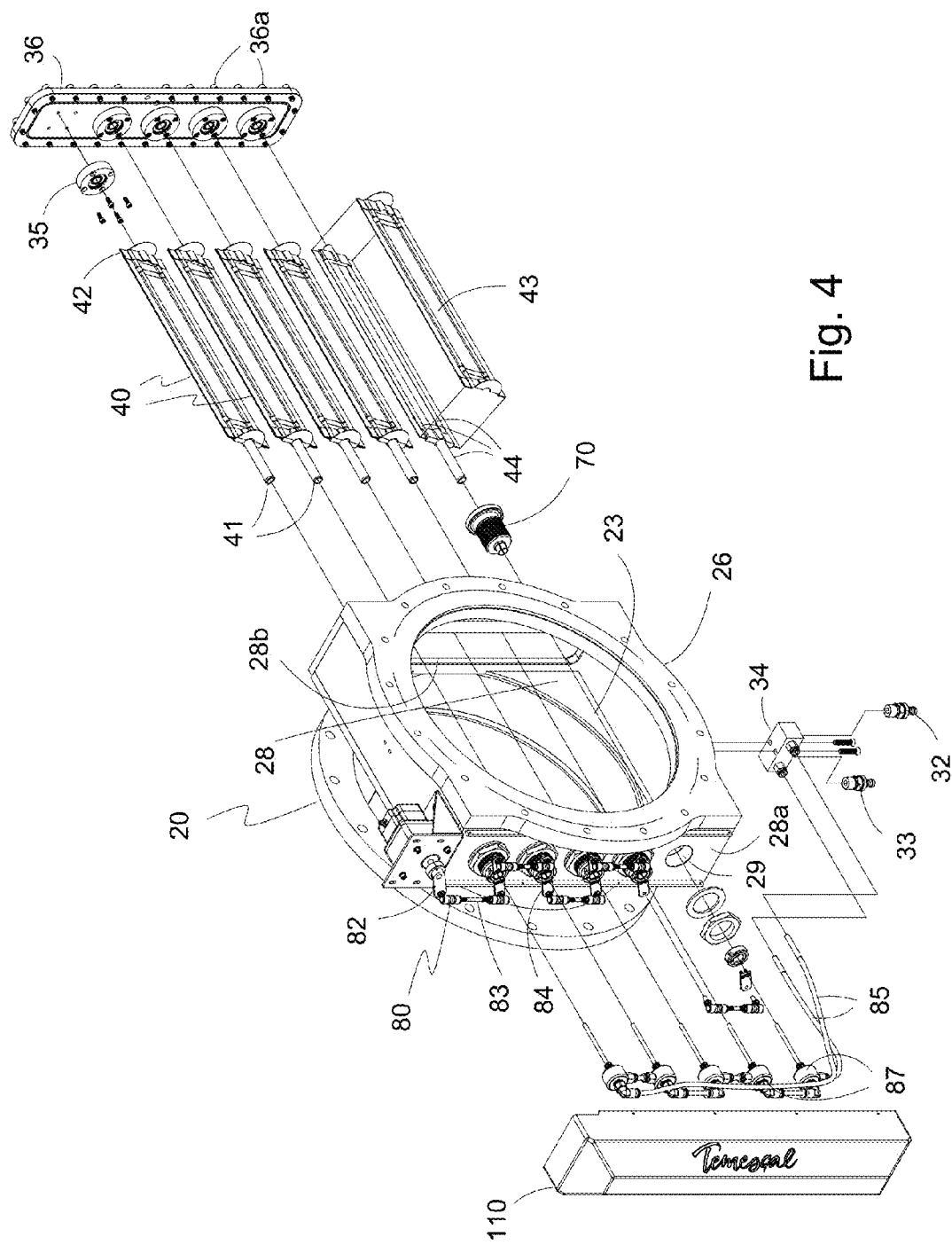
FIG. 4 is an exploded view of the embodiment in FIG. 2 showing the debris shield and the magnetic fluid feedthrough.

The preferred embodiment of the present invention is illustrated in FIGS. 2-28. FIG. 2 illustrates one embodiment of a multi-vane throttle valve 10 of the present invention. Throttle valve 10 includes a throttle chamber body 20, a plurality of rotatable vanes 40, and a drive mechanism 80. Throttle chamber body 20 has a vane chamber housing 20a, an inside surface 21 and an outside surface 22 that defines a through-opening 23 in which are disposed the plurality of rotatable vanes 40. Drive mechanism 80 is disposed on and connected to an outside 22 of the throttling chamber body 20 for moving the plurality of rotatable vanes 40 to vary the flow of process gases. Drive mechanism 80 has a drive motor 81 with an actuator arm 82 connected to a releasable linking arm 83 that is releasably and rotatably connected to a rotating arm 84. A fluid conduit 85 is interconnected with each of the plurality of rotatable vanes 40.

FIG. 3 is a bottom view of multi-vane throttle valve 10. From this view, it can be seen that this embodiment of throttle chamber body 20 includes a first body flange 24 that is the vacuum pump side and a second body flange 26 that is the process chamber side. Between first body flange 24 and second body flange 26 is through-opening 23, which includes a vane chamber 28 in which is mounted the plurality of rotatable vanes 40. Vane chamber 28 has a bottom plate 30 on which is mounted a cooling fluid inlet port 32 and a cooling fluid outlet port 33 mounted to a cooling fluid manifold 34.

Turning now to FIG. 4, there is shown an exploded view of the embodiment of multi-vane throttle valve 10 illustrated in FIG. 1. As can be more clearly seen, throttle chamber body 20 has through-opening 23 showing vane chamber 28 adjacent second body flange 26. Vane chamber 28 has a first chamber side wall 28a with a plurality of equally-spaced openings 29 in which each opening 29 are mounted a vacuum seal feedthrough 70. Each vacuum seal feedthrough 70 receives therethrough one end 41 of one of the plurality of rotatable vanes 40. Vacuum seal feedthroughs 70 rotatably support vanes 40.

Each of the plurality of rotatable vanes 40 are rotatably supported on an opposite end 42 by a bearing 35 mounted on second side wall plate 36. Second side wall plate 36 is sealingly but removably attached to second side wall 28b with a plurality of bolts 36a to facility access to vane chamber 28 for maintenance and repair when required. In this embodiment, each vane 40 has an optional debris shield 43 attached to one side of vane 40 that is facing the process chamber. Debris shields 43 are preferably used when vane 40 is fabricated from copper. When vane 40 is fabricated from stainless steel, no debris shields are necessary.

Where the process chamber is typically used for chemical vapor deposition, debris which includes the various chemicals that are used for coating targets within the process chamber is more easily removed from stainless steel than from copper. Further, the rotatable vanes 40 also prevent the debris from reaching the vacuum pump, which is more costly to repair so preventing debris from entering the vacuum pump is one important aspect of the present invention.

Another important aspect is the heat involved during the process being undertaken in the process chamber. Because the vacuum pump is typically continuously operating during a process, heated gases involved in the process within the process chamber are evacuated through the vacuum pump. The heat from the gases also causes damage to the vacuum pump. Even though the plurality of vanes 40 when in a completely closed position helps reduce this effect, it is not a practical solution since the purpose of the throttling vanes 40 is to better control the vacuum process, closing them completely is counter-productive.

Another important aspect of the present invention is the incorporation of a cooling system for cooling each of the rotatable vanes 40. The plurality of vanes 40 in the present invention include a cooling conduit 44 that is disposed in and longitudinally extends along the length of each of the plurality of vanes 40. An external cooling liquid flows through cooling conduit 44 in order to remove the heat absorbed from the gas that is being evacuated by the vacuum pump throughopening 23 of multi-vane throttle valve 10. Cooling conduit 44 is in fluid communication with fluid conduit 85 which includes a plurality of rotary joints 87. An optional drive mechanism cover 110 may be mounted over drive mechanism 80 and rotary joints 87 to enclose and protect actuator arm 82, linking arms 83 and rotary arms 84.

Turning now to FIG. 5, there is shown a perspective view of one embodiment of a vane 40 of the present invention. In this embodiment, vane 40 has a proximal vane end 45 and a distal vane end 46. Distal vane end 46 has a distal support 47 configured to connect distal vane end 46 to a mating support component in second side wall plate 36 of throttle chamber body 20 in a rotatable relationship. Proximal vane end 45 has a proximal support 48 configured to connect proximal vane end 45 to a matting support component in first chamber side wall 28a of throttle chamber body 20 in a rotatable relationship. Vane 40 has a first cooling conduit 44a that extends longitudinally through one half of vane 40 and a second cooling conduit 44b that extends longitudinally though the other half of vane 40. A connecting cooling conduit 44c (shown in FIG. 7) communicates transversely with first cooling conduit 44a and second cooling conduit 44b adjacent distal vane end 46 to create a continuous cooling conduit 44.

Although a linear cooling fluid pathway or conduit is illustrated, it is noted that the cooling conduit may have other configurations such as straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, and a longitudinal heat pipe. FIG. 5A illustrates a vane with a pair of square-wave, cooling conduits.

FIG. 6 illustrates a perspective view of optional debris shield 43. Debris shield 43 attaches to one side of vane 40, preferably the side that is exposed to the process chamber in order to prevent damaging material from the process chamber from entering into the vacuum pump. Debris shield 43 may be attached to vane 40 using any known methods including, but not limited to, brazing, using mechanical fasteners, attaching components to allow the shield to snap fit onto vane 40, and the like. Debris shield 43 is preferably made of stainless steel but may be made of any metal and/or non-metal material capable of protecting vanes 40 and maintaining the shields integrity during one or more vacuum chamber processes.

Figure 7:
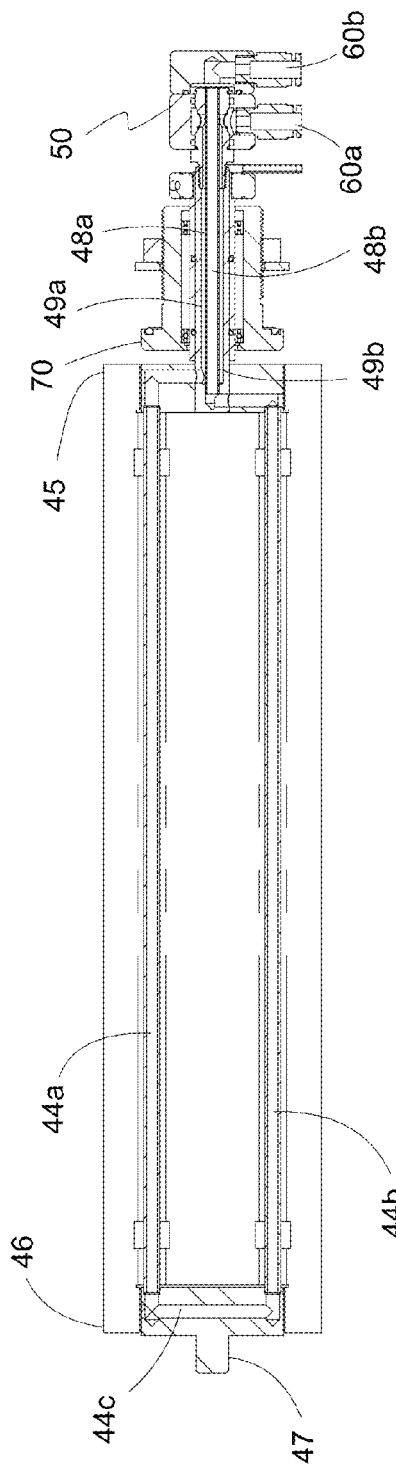
FIG. 7 is a side view of one embodiment of a rotatable vane showing a cross-sectional view of a magnetic fluid support and a rotary joint.

FIG. 7 is a side, partial cross-sectional view of the embodiment of vane 40 shown in FIG. 5 with a coolant supply and coolant return member. As previously discussed, this embodiment of vane 40 includes a proximal vane end 45 and a distal vane end 46. Distal vane end 46 has a distal support 47 while proximal vane end 45 has proximal support 48. Vane 40 has a first cooling conduit 44a that extends longitudinally along or through one half of vane 40 and a second cooling conduit 44b that extends longitudinally along or though the other half of vane 40. A connecting cooling conduit 44c communicates transversely with first cooling conduit 44a and second cooling conduit 44b adjacent distal vane end 46 to create a continuous cooling conduit 44. At proximal vane end 45, proximal support 48 is configured as a pair of concentric tubes 49a (outer tube), 49b (inner tube) forming an outer conduit chamber 48a and an inner conduit chamber 48b where the outer conduit chamber 48a fluidly communicates with first cooling conduit 44a and inner conduit chamber 48b fluidly communicates with second cooling conduit 44b. Inner and outer conduit chambers 48a, 48b extend into a rotary adapter 50 that where each of the inner and outer conduit chambers 48a, 48b communicates with a coolant supply port 60a and a return port 60b, respectively.

Figure 8:
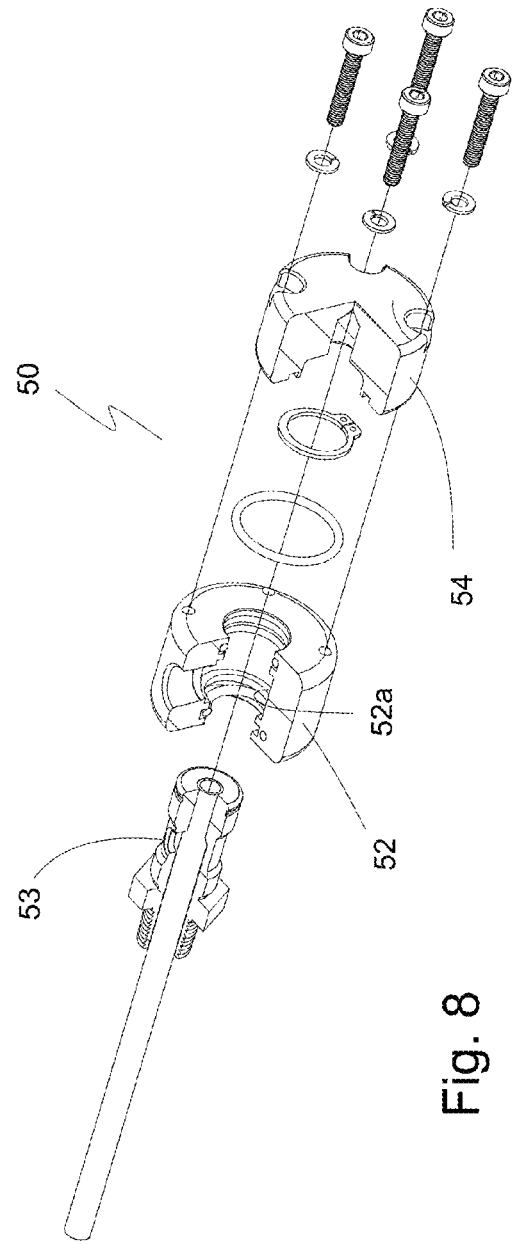
FIG. 8 is a perspective, exploded view of a rotary joint of the present invention.

FIG. 8 shows an exploded, perspective view of rotary adapter 50 illustrated in FIG. 7. In this embodiment of rotary adapter 50, adapter 50 includes a first rotary housing 52 and a second rotary housing 54 axially aligned with and secured to first rotary housing 52. Adapter 50 also includes a hollow shaft 53 that is axially disposed within first rotary housing 52 and is configured to receive inner tube 49b through hollow shaft 53 and into second rotary housing 54. A space 52a is formed between a portion of the outside surface of hollow rotary shaft 53 and the inside wall of first rotary housing 52, which space 52a fluidly communicates with outer conduit chamber 48a of proximal support 48. As shown in FIG. 7, coolant supply port 60a is physically connected to first rotary housing 52 and coolant return supply port 60b is physically connected to second rotary housing 54. This embodiment provides coolant into and out of vane 40 through proximal vane end 45.

Figure 9:
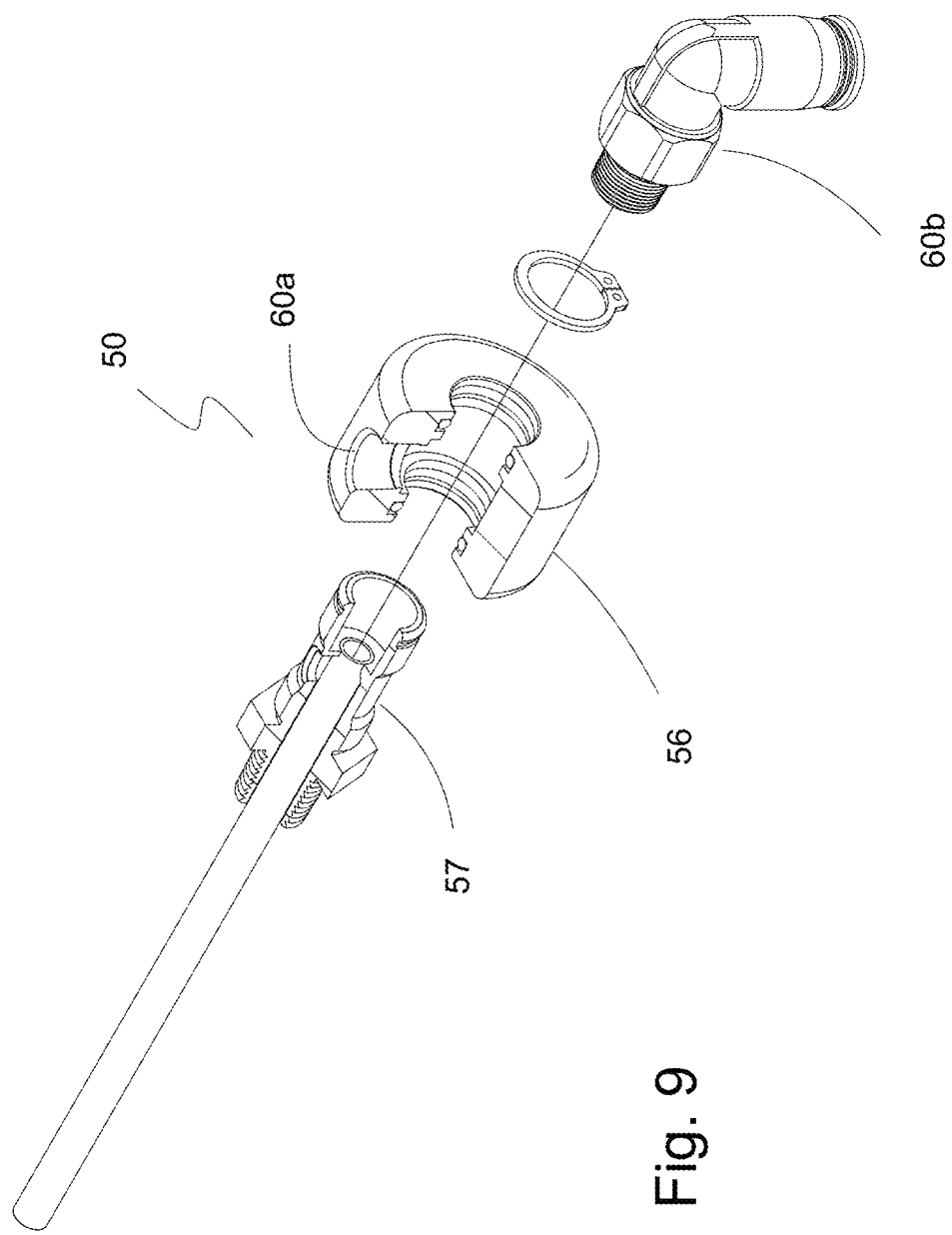
FIG. 9 is a perspective view of another embodiment of a rotary joint of the present invention.

FIG. 9 is a perspective, partial cross-sectional view of another embodiment of rotary adapter 50. In the embodiment, rotary adapter 50 includes only a single rotary housing 56 and a modified rotary shaft 57. Rotary housing 56 provides the same function as first rotary housing 52 with coolant supply port 60a. Rotary shaft 57 is extended through rotary housing 56 and terminated with coolant return port 60b. This embodiment reduces the number of parts required for rotary adapter 50 making assembly and maintenance easier as well as reducing the cost of rotary adapter 50 while providing the same function.

FIG. 10 is an enlarged, cross-sectional view of rotary valve 50 and proximal support 48 showing the fluid flow for cooling vanes 40. In this embodiment, it is illustrated that outer tube 49a of proximal support 48 is rotatably supported by a feedthrough support 70, which is secured to first chamber side wall 28a and inner tube 49b extends beyond feedthrough support 70 and into rotary valve 50. Arrows 150 indicate the flow of coolant into a vane 40 and arrows 160 indicate the flow of coolant out of vane 40. Notwithstanding the description provided above about rotary valve 50 illustrated in FIG. 8, it is understood that when coupling two or more vanes 40 to the coolant supply, one rotary valve 50 will have rotary housing 56 connected to the coolant supply port 60a axially on an end and to the coolant return port 60b transversely but that the next, adjacent vane 40 that is fluidly connected in series to the earlier vane 40, rotary valve 50 will have rotary housing 56 connected to the coolant return port 60b axially on the end and to the coolant supply port 60a transversely. For each additional vane 40, the assignment of coolant supply port 60a and coolant return port 60b to the axial or transverse connection to rotary housing 56 will alternate accordingly in order to form a continuous coolant circuit through vanes 40.

Turning now to FIG. 11, there is illustrated a side view of a vane 40 with rotary valve 50 illustrated and described in FIG. 9. Like the embodiment of vane 40 illustrated in FIG. 5, this embodiment of vane 40 includes proximal vane end 45 with proximal support 48 and distal vane end 46 with distal support 47. Vane 40 has first cooling conduit 44a that extends longitudinally through one half of vane 40 and second cooling conduit 44b that extends longitudinally though the other half of vane 40. Connecting cooling conduit 44c communicates transversely with first cooling conduit 44a and second cooling conduit 44b adjacent distal vane end 46 to create continuous cooling conduit 44. At proximal support 48 of proximal vane end 45, rotary adapter 50 includes only single rotary housing 56 and modified rotary shaft 57. Rotary housing 56 provides the same function as first rotary housing 52 with coolant supply port 60a. Rotary shaft 57 fluidly communicates through rotary housing 56 and with coolant return port 60b.

FIG. 12 illustrates another embodiment of vane 40. In this embodiment, vane 40 has a single, coolant conduit 44 that is extends longitudinally along the longitudinal central axis of vane 40 from proximal support 48 to distal support 47. Proximal support 48 is rotatably supported by feedthrough 70 and includes a single feedthrough collar 72. Because feedthrough 70 rotatably supports proximal vane support 48, coolant supply port 60a may be fixedly attached to feedthrough collar 72 where proximal support 48 is a single tube and not a pair of concentric tubes. Furthermore, it should be noted that since coolant conduit 44 is a single tube that extends along the longitudinal central axis of vane 40, then the fluid coolant must enter one end of vane 40 (i.e. proximal vane end 45 or distal vane end 46) and exit the other end. Accordingly, distal support 47 must also include similar feedthrough 70 and feedthrough collar 72 to which coolant return port 60b is attached. As explained above, where two or more vanes 40 are incorporated within throttle valve 10, the assignment of coolant supply port 60a and coolant return port 60b to the feedthrough collars 72 at proximal vane end 45 and distal vane end 46 will alternate accordingly in order to form a continuous coolant circuit through vanes 40.

FIG. 13 illustrates another embodiment of coolant conduit 44 of vane 40 (not shown) where cooling fluid, i.e. coolant, enters and exits from the same end (i.e. proximal vane end 45) of vane 40. In this embodiment, coolant conduit 44 is a pair of concentric tubes 44d (outer tube) and 44e (inner tube) that extends along the longitudinal central axis of vane 40 creating an outer conduit chamber 44f and an inner conduit chamber 44g. Coolant fluid enters one of the conduit chambers and exits through the other of the conduit chambers. FIG. 13A illustrates an enlarged view of coolant conduit 44 at distal vane end 46. Arrows 200 indicate the flow of coolant along the inside of coolant conduit 44. In this configuration, a rotary valve 50 along with feedthrough 70 supports proximal support 48 formed by coolant conduit 40 at proximal vane end 45. As previously described, the direction of coolant fluid flow relative to outer and inner conduit chambers 44f, 44g will alternate for assemblies having two or more vanes 40.

Figure 14:
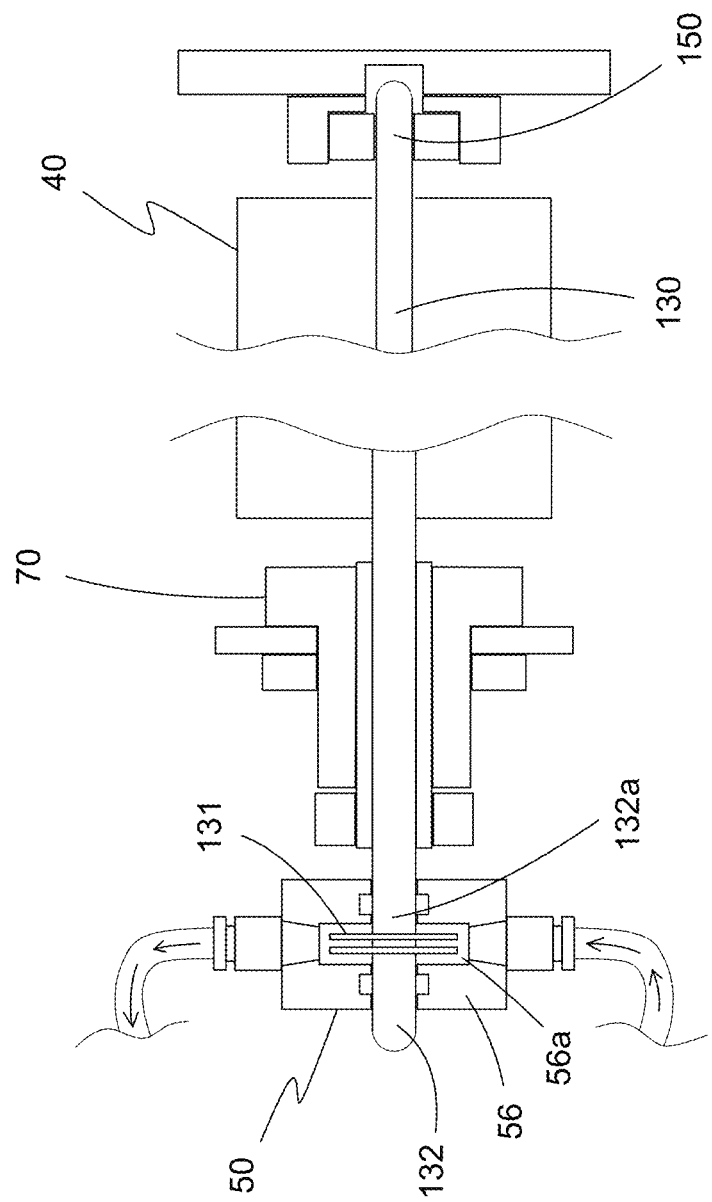
FIG. 14 is a cross-sectional view of another embodiment of a vane of the present invention showing a heat pipe positioned along the longitudinal central axis of the vane.

FIG. 14 illustrates another embodiment of vane 40 with a cooling conduit. In this embodiment, the cooling system of vane 40 includes a heat pipe 130 disposed along the longitudinal central axis of vane 40 that has a heat pipe proximal end 132 and a heat pipe distal end 150. Heat pipe distal end 150 is rotatably supported by a bearing 152 disposed in a bearing housing 154 attached to second side wall 36 of throttle housing body 22. Heat pipe proximal end 132 is rotatably supported by feedthrough 70 and extends outside of throttle housing body 22 into a rotary adapter 50. An end portion 132a of heat pipe proximal end 132 is rotatably held within rotary adapter 50. Rotary adapter 50 may be a coolant block having a rotary housing 56 forming an adapter chamber 56a, coolant supply port 60a and a coolant return port 60b in fluid communication with adapter chamber 56a. Around heat pipe proximal end 132 that is disposed within adapter chamber 56a are connected a plurality of heat pipe cooling fins 131 that are thermally connected to heat pipe 130. Instead of a coolant block, one or more thermoelectric modules may be incorporated as part of rotary adapter 50, which would provide the cooling mechanism for cooling heat pipe proximal end 132. Heat pipe 130 and the thermoelectric module have the typical operating and structural characteristics of those components and are well known to those of ordinary skill in the respective arts so no explanation or discussion of their operation is required.

FIG. 15 illustrates a perspective view of one embodiment of feedthrough 70. Feedthrough 70 has a feedthrough flange 74 and securing nut 75 for attaching feedthrough 70 to a side wall of vane chamber 28. Feedthrough 70 also includes a hollow shaft 76 for receiving and supporting the end of vane 40. Hollow shaft 76 rotated within feedthrough 70 and maintains a seal between the inside of throttle vane valve, which is at a reduced pressure, and the outside of throttle vane valve, which is at atmospheric pressure.

FIGS. 16A and 16B illustrate one embodiment of a sealing structure of feedthrough 70 used to rotatably support proximal support 48 and, in the case where a single coolant conduit is disposed along the longitudinal central axis of vane 40, and distal support 47. In one embodiment shown in FIGS. 16A and 16B, feedthrough 70 incorporates a quad O-ring 77 seal to isolate the vacuum inside the throttle valve body 22 and the atmosphere outside of throttle valve body 22. Quad O-ring 77 incorporates two sealing surfaces 77a, 77b on the outer periphery of the O-ring and two sealing surfaces 77c, 77d on the inner periphery of the O-ring. The quad O-ring 77 provides increased reliability over standard O-rings.

FIG. 17 illustrates a side view of a preferred embodiment of feedthrough 70. In this embodiment, feedthrough 70 incorporates a magnetic fluid seal and associated components for forming such a seal. The preferred magnetic fluid feedthrough 70 is available from Ferrotec (USA) Corporation, Bedford, N.H. under custom product no. HS-500-SFBSC.

Figure 18:
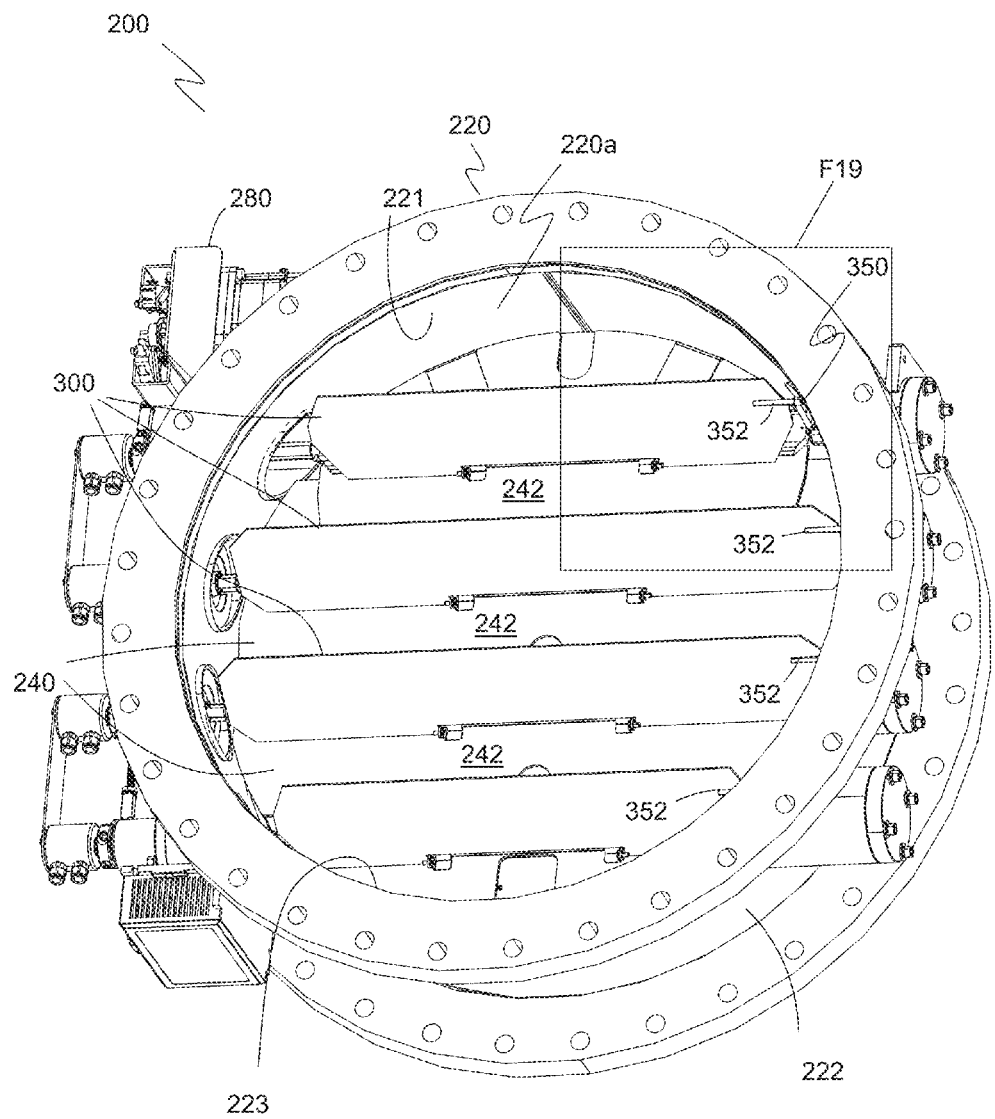
FIG. 18 is a rear, perspective view of another embodiment of the present invention showing a multi-vane throttle valve.

Turning now to FIG. 18, there is illustrated another embodiment of a throttle valve showing a rear, perspective view of a multi-vane throttle valve 200. Throttle valve 200 includes a throttle chamber body 220, a plurality of rotatable vanes 240, and a drive mechanism 280. Throttle chamber body 220 has a vane chamber 220a, an inside surface 221 and an outside surface 222 that defines a through-opening 223 in which are disposed the plurality of rotatable vanes 240. Each of the plurality of rotatable vanes 240 has a reciprocal vane 300 that pivots reciprocally when the respective rotatable vane 240 rotates. Optionally, reciprocal vane 300 is pivotally attached to a back side 242 of rotable vane 240.

Figure 20:
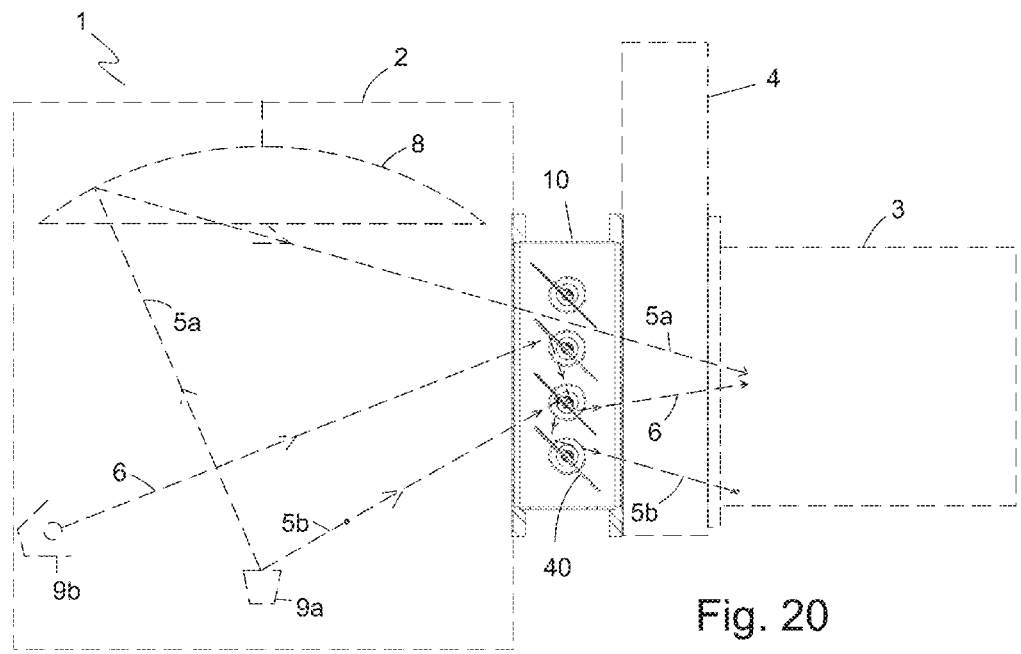
FIG. 20 is a schematic view showing heat and particle pass-through to a vacuum pump when a multi-vane throttle valve of FIG. 2 is used in an electron beam vacuum system.
Figure 21:
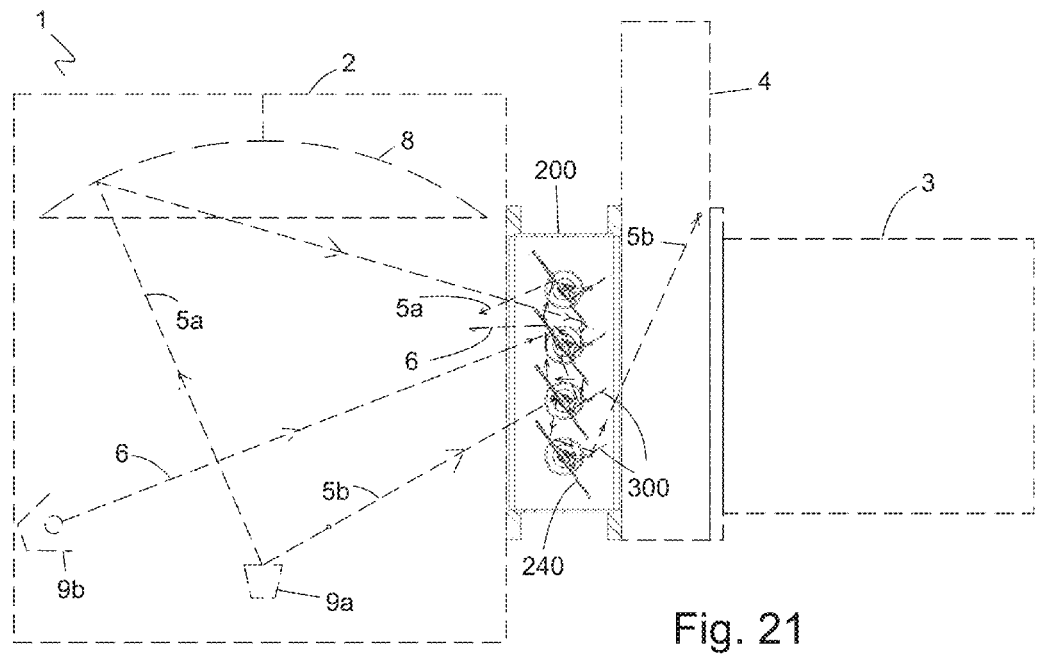
FIG. 21 is a schematic view showing heat and particle shielding of a vacuum pump when a multi-vane throttle valve of FIG. 18 having a throttle reciprocal vane is used in an electron beam vacuum system.

It is noted that the front side of the multi-vane throttle valve 200 faces the process chamber 1 (shown in FIGS. 20 and 221) and the back side of throttle valve 200 faces the vacuum pump 2 (also shown in FIGS. 20 and 21). As can be seen in the embodiment shown in FIG. 18, each reciprocal vane 300 extends backwardly from its respective rotatable vane 240. Along a supported side portion 302 of reciprocal vane 300, there is disposed a stationary reciprocal vane angling assembly 350. Angling assembly 350 includes an assembly pin 352 that extends transversely toward reciprocal vane 300 a predefined distance sufficient to support reciprocal vane 300.

Figure 19:
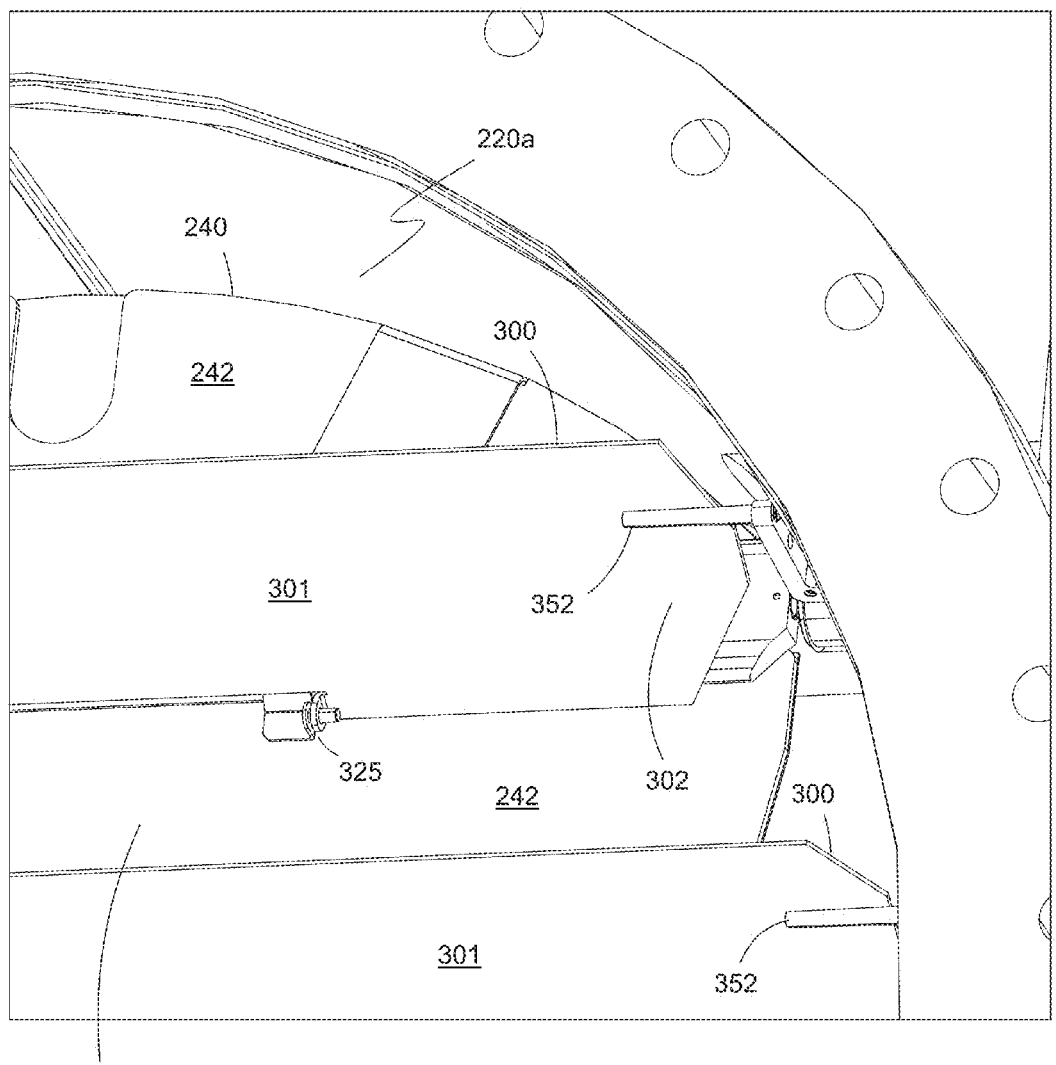
FIG. 19 is an enlarged, rear perspective view of a reciprocal vane of the multi-vane throttle valve of FIG. 18.

FIG. 19 is an enlarged view of the area labeled F19 in FIG. 18. Assembly pin 352 is in a fixed and stationary position within vane chamber 220a so that assembly pin 352 does not move when the plurality of rotatable vanes 240 are rotated between a fully open position where the rotatable vanes 240 are parallel to the direction of flow and a fully closed position where the rotatable vanes 240 are at a substantially high angle relative to the open, parallel position. An efficient and simple configuration to accomplish varied angling of reciprocal vane 300 is to locate the pivotal connection on the back side 242 of the rotatable vane 240 a predefined distance from an axis of rotation 400 (shown in FIGS. 22-23) of rotatable vane 240. In this way, as the pivotal connection 235 changes its spatial location because of rotation of rotatable vane 240, a supported side 301 of reciprocal vane 300 slides across fixed assembly pin 352 at supported side portion 302 causing reciprocal vane 300 to change its orientation from a parallel position when rotatable vane 240 is in the fully open and horizontal position to a transverse position relative to the rotatable vane 240 when rotatable vane 240 is rotated.

FIGS. 20 and 21 illustrate the importance of reciprocal vane 300. FIG. 20 is an illustration of an electron beam vacuum deposition system 1 without reciprocal vanes 300. Deposition system 1 includes a process chamber 2, a vacuum pump 3, a gate valve 4 between vacuum pump 3 and process chamber 2, and throttle valve 10 between vacuum pump 3 and process chamber 2. Within process chamber 2 is disposed a substrate holder 8 located at the top of chamber 2 that contains a plurality of substrates (not shown) for undergoing vacuum deposition. Centrally located at the bottom of chamber 2 is the target material 9a, which is evaporated using an electron beam (not shown). Due to the low vacuum level (i.e. $10^{-6}$ to $10^{-7}$ torr), the evaporated material travels in a straight line. Substrate holder 8 has a curvature substantially similar to the curvature of a sphere whose center is located at target material 9a thereby insuring that evaporated material impacts the substrates orthogonally, which is important for later processing of the coated substrates using a lift-off process. Also located within process chamber 2 is a heat source 9b. Reference arrows 5a and 5b represent only two of many trajectories of the target material particles ejected from target material 9a. Reference arrow 6 represents only one of many trajectories of heat from heat source 9b. Notwithstanding that rotatable vanes 240 prevent a major portion of heat and target particles (i.e. debris) from reaching vacuum pump 3, there are a number of particles that penetrate past the plurality of rotatable vanes 40 and into vacuum pump 3, as can be seen from FIG. 20. Any amount of heat and target particles that pass through throttle valve 10 shortens the life of vacuum pump 3.

Turning now to FIG. 21, there is illustrated the advantageous effect of including reciprocal vane 300 within throttle valve 200. As illustrated, reference arrows 5a and 5b represent only two of many trajectories of the target material particles ejected from target material 9a. Reference arrow 6 represents only one of many trajectories of heat from heat source 9b. As can be seen from FIG. 21, reciprocal vanes 300 extend transversely and backwardly from rotatable vane 240. The angle of the reciprocal vanes 300 ensures that target material particles and heat is deflected away from vacuum pump 3. In the embodiment where rotatable vanes 240 have a coolant block 246 (shown in FIGS. 22-25), heat is either deflected or absorbed by coolant block 246.

Figure 22:
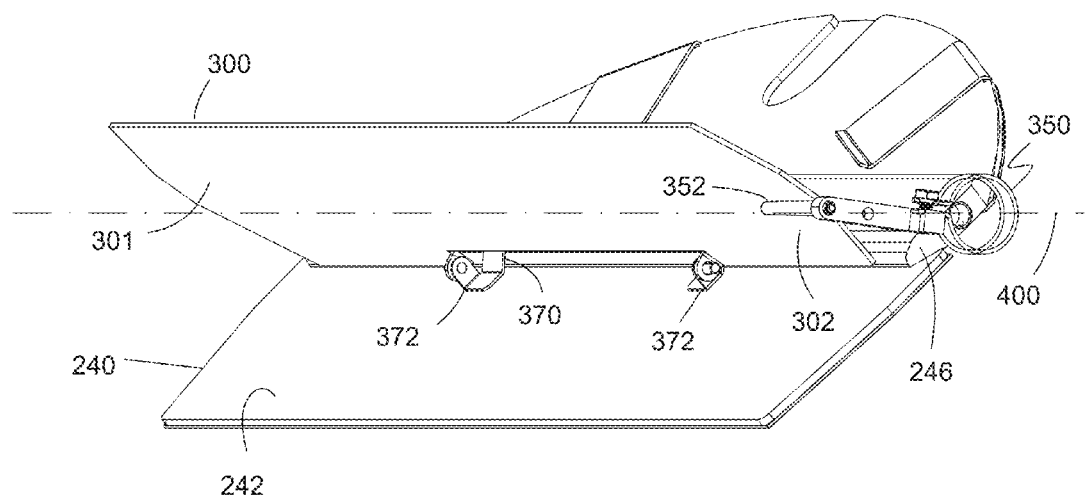
FIG. 22 is a perspective view of the multi-vane throttle valve of FIG. 18 showing only one combination of a rotatable vane with a reciprocal vane where the rotatable vane of the throttle valve is in a partially open position.
Figure 23:
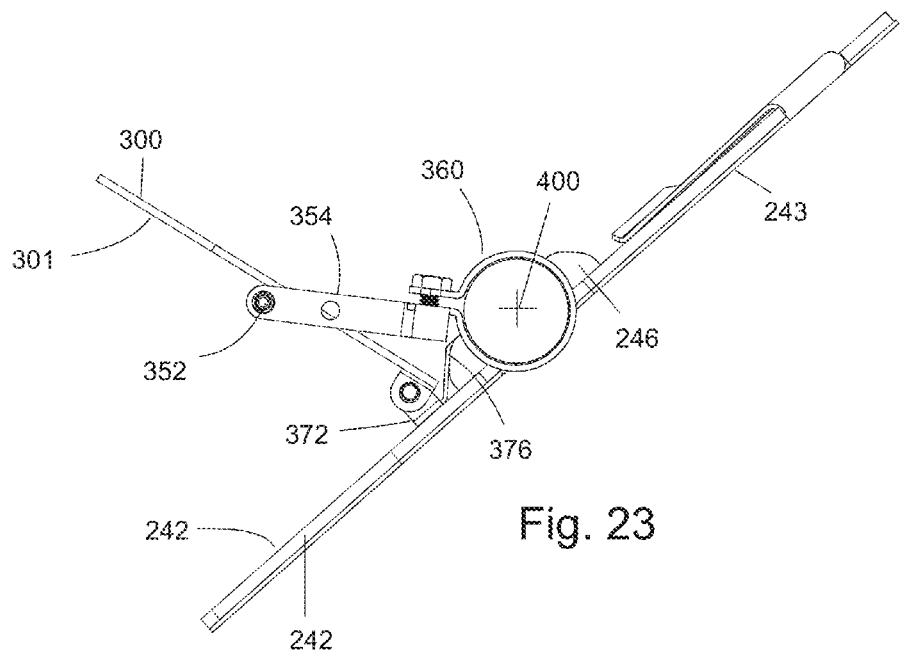
FIG. 23 is a side view of the rotatable vane with the reciprocal vane shown in FIG. 22.

FIGS. 22 and 23 illustrate enlarged views of a single rotatable vane 240 with reciprocal vane 300 for clarity. FIG. 22 is a perspective view and FIG. 23 is a side view that more clearly show reciprocal vane 300. Reciprocal vane 300 is pivotally attached to a back side 242 of rotatable vane 240. In this embodiment, a reciprocal vane bracket 370 pivotally supports reciprocal vane 300 at reciprocal bracket portion 372. Also in this embodiment, rotatable vane 240 includes coolant block 246 and a debris shield 243 attached to rotatable vane 240. Reciprocal vane bracket 370 may include a proximal end 376 that is fixedly attached to coolant block 246 while reciprocal bracket portion 372 rests against back side 242 of rotatable vane 240. It is contemplated that reciprocal bracket portion 372 may also be fixedly attached to back side 242 of rotatable vane 240. In an embodiment where reciprocal bracket portion 372 is attached to rotatory vane 240, reciprocal bracket 370 may or may not have a proximal end 376.

In one embodiment, stationary reciprocal vane angling assembly 350 may be only assembly pin 352 that is fixedly attached to inside surface 221 of throttle chamber body 220 in an appropriate location to effect the intended pivoting of reciprocal vane 300. In another embodiment, stationary reciprocal vane angling assembly 350 includes assembly pin 352 that extends transversely from a distal end portion 355 of an assembly arm 354. Assembly arm 354 also has a proximal end portion 356 that is connected to an assembly clamp 360. Assembly clamp 360 is fixedly attached to a non-moving element or structure within throttle valve 200. As can be seen from FIG. 23, rotatable vane 240 is in a partially open position. Notwithstanding the type of embodiment of assembly pin 352 used, the degree of angling of reciprocal vane 300 to rotatable vane 240 is determined by the location of the fixed position of assembly pin 352 relative to the supported side 351 of reciprocal vane 300. For example, as assembly pin 352 is positioned closer to pivotal connection 235, the greater the angling of reciprocal vane 300 relative to rotatable vane 240 becomes. It is also contemplated that pin 352 may have a cone shape or having at least a side of pin 352 that contacts reciprocal vane 300 be tapered so that only a small area on pin 352 actually contacts supported side 351 instead of the entire length of pin 352. This shape has the advantage of reducing the amount of debris caused by the contact between pin 352 and reciprocal vane 300. In fact, the tapered/cone shape is shown in FIG. 26.

Figure 24:
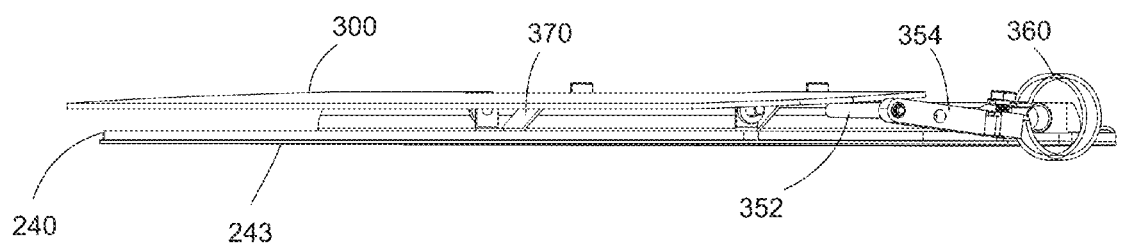
FIG. 24 is a view of the combination of the rotatable vane with the reciprocal vane in a fully open position.
Figure 25:
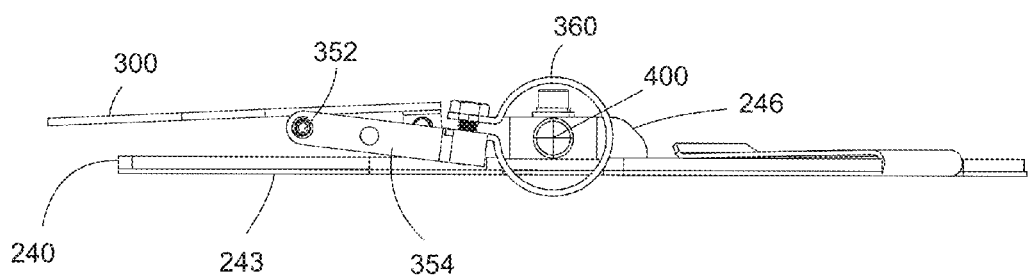
FIG. 25 is a side view of the rotatable vane with the reciprocal vane shown in FIG. 24.

FIGS. 24 and 25 are perspective and side views, respectively, of rotatable vane 240 and reciprocal vane 300 shown in FIGS. 22-23. All reference numbers in FIGS. 24 and 25 refer to the same elements shown in FIGS. 22 and 23. Particularly comparing FIG. 23 (partially open rotatable vane) to FIG. 25 (full open position of rotatable vane), it can be seen that, as rotatable vane 240 rotates on axis of rotation 400, reciprocal vane portion 372 of reciprocal vane bracket 370 moves towards assembly arm 354. As rotatable vane 240 rotates in that direction, reciprocal vane 300 moves across assembly pin 352 (which is in a fixed and stationary position) and changes the angle of reciprocal vane 300 relative to rotatable vane 240 such that reciprocal vane 300 achieves a substantially parallel and horizontal position similar to rotatable vane 240 when rotatable vane 240 is in a fully open position. The fully open position of rotatable vane 240 is used when process chamber 2 is being evacuated prior to engaging the vapor deposition process.

Figure 26:
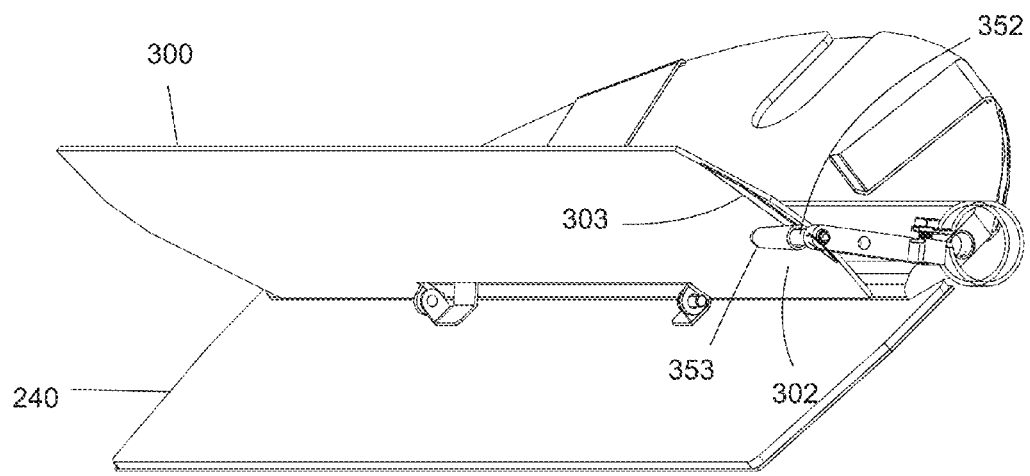
FIG. 26 is a perspective view of another embodiment of the combination of a rotatable vane with a reciprocal vane having magnetic elements disposed on the reciprocal vane and a reciprocal vane support pin.
Figure 27:
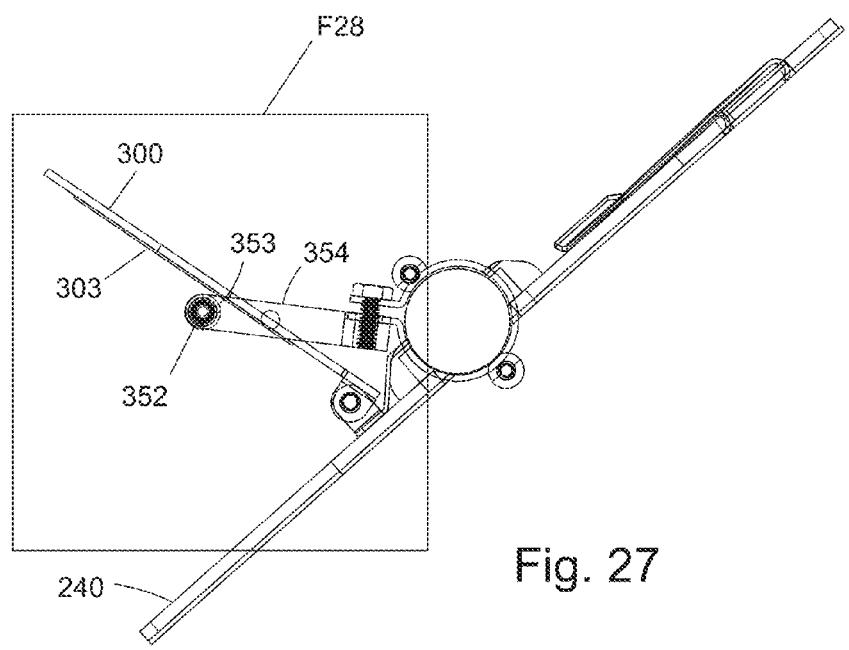
FIG. 27 is a side view of the rotatable vane with the reciprocal vane shown in FIG. 26.

Turning now to FIGS. 26 and 27, there is illustrated perspective and side views of another embodiment of assembly pin 352 used with rotatable vane 240 and reciprocal vane 300. In this embodiment, a pin magnetic element 353 is fixedly connected to assembly pin 352 and the corresponding supported side portion 302 has a corresponding reciprocal vane magnetic element 303. Pin magnetic element 353 may surround assembly pin 352 or may only be connected to a portion of assembly pin 352 that is opposed to supported side portion 302. Reciprocal vane magnetic element 303 covers a predefined area of supported side portion 302 of reciprocal vane 300 that corresponds to the total area of supported side portion 302 that moves across assembly pin 352. Additionally, it is required that pin magnetic element 353 and reciprocal vane magnetic element 303 have the same magnetic pole facing each other to thereby repel each other. This is done to provide non-contact, reciprocal vane angling adjustment. In other words, as rotatable vane 240 rotates causing reciprocal vane 300 to "slide" across assembly pin 352, it does so without physical contact between assembly pin 352 and supported side portion 302 because the like magnetic fields of pin magnetic element 353 and reciprocal vane magnetic element 303 prevent assembly pin 352 and supported side portion 302 from touching each other. This magnetic system also prevents wear and tear caused by sliding contact between assembly pin 352 and supported side portion 302 of reciprocal vane 300, which wear and tear may also generate debris over time that could affect vacuum pump 3. FIG. 27 illustrates the components in wireframe (i.e. transparent) mode to better show the magnetic elements 353, 303.

Figure 28:
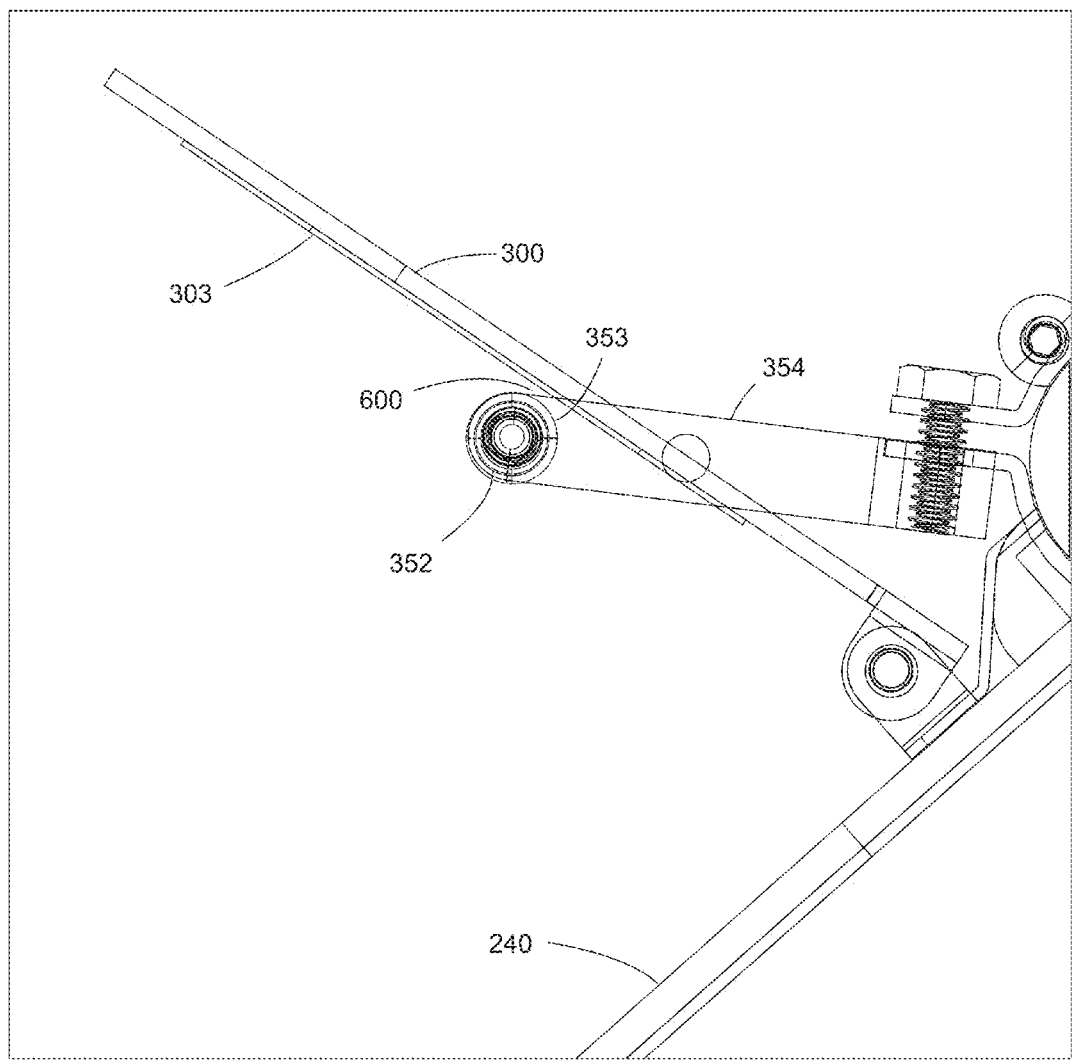
FIG. 28 is an enlarged view of the rotatable vane with the reciprocal vane of FIG. 27 showing the like magnetic elements forming a non-contact support pin.

FIG. 28 is an enlarged view of reference F28 shown in FIG. 27. As illustrated a space 600 is formed between assembly pin 352 and supported side portion 302 caused by the repulsive forces of pin magnetic element 353 and reciprocal vane magnetic element 303. The strength of the magnetic field and the strength of the repulsive forces between pin magnetic element 353 and reciprocal vane magnetic element 303 need only be sufficient to prevent contact between assembly pin 352 and supported side portion 302 of reciprocal vane 300.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A multi-vane throttling valve for a vacuum process chamber having a throttle chamber body with a through-opening, an inside exposed to the vacuum process chamber and an outside exposed to atmospheric pressure, a plurality of rotatable vanes mounted within the through-opening for controlling a flow of gases through the through-opening, and a drive mechanism for rotating the plurality of rotatable vanes, the valve comprising:
   a reciprocal vane pivotally connected to a back side of each of the plurality of rotatable vanes and extending backwardly away from each of the respective rotatable vane; and
   a stationary reciprocal vane angling assembly fixed in a predefined position, the vane angling assembly having an assembly pin extending transversely toward the reciprocal vane a predefined distance sufficient to support the reciprocal vane;
   whereby the stationary angling assembly causes the reciprocal vane to pivot in a range between a substantially parallel position with the respective rotatable vane and a transverse position with the respective rotatable vane when the respective rotatable vane is rotated to control the flow of gases through the through-opening.

2. The multi-vane throttling valve of claim 1 wherein the stationary angling assembly further includes an assembly arm extending backwardly a predefined distance from the axis of rotation of a respective rotatable vane wherein the assembly pin is fixedly attached to a distal end of the assembly arm.

3. The multi-vane throttling valve of claim 2 wherein the stationary angling assembly further includes an assembly clamp connected to a proximal end of the assembly arm wherein the assembly clamp is fixed to a non-moving element within the throttle valve.

4. The multi-vane throttling valve of claim 1 wherein the reciprocal vane is offset from an axis of rotation of the respective rotatable vane.

5. The multi-vane throttling valve of claim 1 further comprising a reciprocal vane bracket having a reciprocal vane portion and a rotatable vane portion wherein the reciprocal vane portion and the reciprocal vane are pivotally connected to each other and the rotatable vane portion is fixedly attached to the rotatable vane.

6. The multi-vane throttling valve of claim 1 further comprising a pin magnetic element disposed on and fixedly attached to the assembly pin, and a reciprocal vane magnetic element disposed on and fixedly attached to a supported side of the reciprocal vane that is opposed to the assembly pin, the pin magnetic element and the reciprocal vane magnetic element having the same magnetic pole facing each other to thereby repel each other providing non-contact, reciprocal vane angling adjustment.

7. The multi-vane throttling valve of claim 1 wherein each of the plurality of rotatable vanes includes a coolant block disposed concentrically on the axis of rotation of the rotatable vane and containing a cooling fluid pathway defining a cooling conduit disposed longitudinally along the rotatable vane.

8. The multi-vane throttling valve of claim 7 wherein the cooling conduit is selected from the group consisting of a straight conduit, a sinusoidal conduit, a square-wave shaped conduit, a pair of longitudinal conduits with a transverse conduit connecting the pair of longitudinal conduits on one end, a pair of concentric conduits defining a flow path between an inner conduit and an outer conduit, and a longitudinal heat pipe.

9. The multi-vane throttling valve of claim 1 further comprising a vacuum feedthrough supporting each of the plurality of rotatable vanes between the vacuum chamber process inside and the atmospheric pressure outside of the throttling valve.

10. The multi-vane throttling valve of claim 9 wherein the vacuum feedthrough is a magnetic fluid vacuum feedthrough.

11. A method of preventing heat and deposition particles in an electron beam vacuum deposition system from entering a vacuum pump of the deposition system during a vacuum chamber process using a throttling valve, the method comprising:

obtaining a multi-vane throttling valve for use with a vacuum process chamber wherein the multi-vane throttling valve has a plurality of rotatable vanes disposed in a vane chamber housing of a throttle chamber body wherein the vane chamber housing has a through-opening and wherein each of the plurality of rotatable vanes has an axis of rotation; configuring each of the plurality of rotatable vanes with a reciprocal vane pivotally connected to a back side of each of the plurality of rotatable vanes and extending backwardly away from each respective rotatable vane; and rotatably adjusting the orientation of each rotatable vane to thereby cause the reciprocal vane to pivot in a range between a substantially parallel position with the respective rotatable vane and a transverse position with the respective rotatable vane when the respective rotatable vane is rotated to control the flow of gases through the through-opening to provide linear conductance control during vacuum processing in the vacuum process chamber.

12. The method of claim 11 further comprising offsetting the reciprocal vane from the axis of rotation of the rotatable vane.

13. The method of claim 11 wherein the configuring step includes attaching a stationary reciprocal vane angling assembly fixed in a predefined position wherein the vane angling assembly has an assembly pin extending transversely toward the reciprocal vane a predefined distance sufficient to support the reciprocal vane.

14. The method of claim 13 wherein the configuring step further include disposing an assembly arm extending backwardly a predefined distance from the axis of rotation of a respective rotatable vane wherein the an assembly pin is fixedly attached to a distal end of the assembly arm.

15. The method of claim 14 wherein the attaching of the vane angling assembly includes fixedly securing an assembly clamp to a proximal end of the assembly arm and to a non-moving element within the throttle valve.

16. The method of claim 11 wherein the configuring step includes securing a rotatable vane portion of a reciprocal vane bracket to the rotatable vane and pivotally connecting a reciprocal vane portion of the reciprocal vane bracket to the reciprocal vane.

17. The method of claim 13 wherein the step of attaching an angling assembly includes disposing on and fixedly attaching a pin magnetic element to the assembly pin and disposing on and fixedly attaching a reciprocal vane magnetic element to the supported side of the reciprocal vane wherein the pin magnetic element and the reciprocal vane magnetic element have the same magnetic pole facing each other to thereby repel each other and to provide non-contact, reciprocal vane angling adjustment.

18. The method of claim 11 wherein the obtaining step include obtaining a plurality of rotatable vanes wherein each of the rotatable vanes has a coolant block disposed concentrically on the axis of rotation of the rotatable blade and containing a cooling fluid pathway defining a cooling conduit disposed longitudinally along the rotatable vane.

19. The method of claim 11 wherein the obtaining step includes obtaining a multi-vane throttling valve having a vacuum feedthrough supporting each of the plurality of rotatable vanes between the vacuum chamber process inside of the throttling valve and the atmospheric pressure outside of the throttling valve.

20. The method of claim 19 wherein the obtaining step includes obtaining a multi-vane throttling valve having a vacuum feedthrough supporting each of the plurality of rotatable vanes that is a magnetic fluid vacuum feedthrough.

21. A method of preventing heat and deposition particles in an electron beam vacuum deposition system from entering a vacuum pump of the deposition system during a vacuum chamber process using a throttling valve, the method comprising:

rotatably adjusting the orientation of a rotatable vane disposed within the throttling valve causing a reciprocal vane pivotally connected to a back side of the rotatable vane to pivot to a transverse position with respect to the rotatable vane wherein the reciprocal vane extends backwardly away from the rotatable vane and is supported by a stationary angling assembly having an assembly pin that supports the reciprocal vane to thereby deflect heat and deposition particles directed toward the throttling valve away from the vacuum pump of the deposition system.

22. The method of claim 21 further comprising selecting a stationary angling assembly and a reciprocal vane that further include a pin magnetic element disposed on and fixedly attached to the assembly pin, and a reciprocal vane magnetic element disposed on and fixedly attached to a supported side of the reciprocal vane that is opposed to the assembly pin wherein the pin magnetic element and the reciprocal vane magnetic element have the same magnetic pole facing each other to thereby repel each other and to provide non-contact, reciprocal vane angling adjustment.

* * * * *